(12) United States Patent
Valle et al.

(10) Patent No.: US 8,479,610 B2
(45) Date of Patent: Jul. 9, 2013

(54) RIGHT CRANK ARM ASSEMBLY FOR A BICYCLE AND CRANK ARM AND FRONT SPROCKET

(75) Inventors: Maurizio Valle, Vicenza (IT); Paoló Pasqua, Vicenza (IT)

(73) Assignee: Campagnolo S.r.l., Vicenza (IT)

( * ) Notice: Subject to any disclaimer, the term of this patent is extended or adjusted under 35 U.S.C. 154(b) by 1241 days.

(21) Appl. No.: 11/832,205

(22) Filed: Aug. 1, 2007

(65) Prior Publication Data

US 2008/0202284 A1 Aug. 28, 2008

(30) Foreign Application Priority Data

Aug. 3, 2006 (IT) .................................. MI06A1549

(51) Int. Cl.
*B62M 3/00* (2006.01)
(52) U.S. Cl.
USPC ........................................................ 74/594.2
(58) Field of Classification Search
USPC .................... 74/594.1, 594.2, 594.7; 474/152, 474/160
See application file for complete search history.

(56) References Cited

U.S. PATENT DOCUMENTS

| 951,137 | A | * | 3/1910 | Lowrance | ...................... 384/458 |
| 2,675,048 | A | | 6/1952 | Ebert | |
| 4,318,310 | A | | 3/1982 | Segawa | |
| 4,418,584 | A | * | 12/1983 | Shimano | ....................... 74/594.2 |
| 4,439,172 | A | | 3/1984 | Segawa | |
| 4,583,422 | A | * | 4/1986 | Boyd | ............................ 74/594.2 |
| 4,594,910 | A | * | 6/1986 | Nagano | ........................ 74/594.2 |
| 4,598,608 | A | | 7/1986 | Ueno | |
| 4,798,565 | A | | 1/1989 | Boyd | |
| 7,011,592 | B2 | | 3/2006 | Shahana et al. | |
| 7,059,989 | B2 | | 6/2006 | Fukui | |
| 2005/0032596 | A1 | | 2/2005 | Nonoshita et al. | |
| 2006/0128512 | A1 | | 6/2006 | Tetsuka et al. | |
| 2008/0028887 | A1 | * | 2/2008 | Valle et al. | .................... 74/594.1 |

FOREIGN PATENT DOCUMENTS

| DE | 4242310 A1 | 1/1994 |
| EP | 0791532 A2 | 8/1997 |
| EP | 0849153 A1 | 6/1998 |
| EP | 1074462 A2 | 2/2001 |

(Continued)

OTHER PUBLICATIONS

Japanese Office Action for Application No. 2007-202301 issued on Aug. 21, 2012.

(Continued)

*Primary Examiner* — Vicky Johnson
(74) *Attorney, Agent, or Firm* — Volpe and Koenig, P.C.

(57) ABSTRACT

A right crank arm assembly for a bicycle, comprises a right crank arm and at least one front sprocket coupled with the crank arm at least one coupling portion of the crank arm. The front sprocket has an inner side adapted, in use, to face towards the frame of the bicycle and an outer side opposite the inner side. The assembly comprises at least one first crank arm element which acts in contact with the front sprocket on one of said sides and at least one second crank arm element which acts in contact with the front sprocket on the other of said sides. The contact action of the crank arm elements on the two opposite sides of the front sprocket prevents the twisting deformation of the front sprocket during pedaling. Such a deformation would cause a reduction in the transmission efficiency of the right crank arm assembly.

95 Claims, 17 Drawing Sheets

FOREIGN PATENT DOCUMENTS

| | | |
|---|---|---|
| EP | 1609714 A2 | 12/2005 |
| JP | 29015234 UB | 11/1955 |
| JP | 3033646 UB | 1/1997 |
| JP | 10181662 A | 7/1998 |
| JP | 2005053410 A | 3/2005 |
| JP | 2006160139 A | 6/2006 |
| TW | 426017 U | 3/2001 |
| TW | 590955 B | 6/2004 |
| TW | I250107 B | 3/2006 |

OTHER PUBLICATIONS

Japanese Office Action for Application No. 2007-202302 issued on Aug. 21, 2012.

Taiwanese Office Action and Search Report dated issued Mar. 29, 2013.

* cited by examiner

RIGHT CRANK ARM ASSEMBLY FOR A BICYCLE AND CRANK ARM AND FRONT SPROCKET

FIELD OF INVENTION

The present invention relates to a right crank arm assembly, crank arm, and front sprocket for a bicycle.

BACKGROUND

Typically, in the field of bicycles, the expression "right crank arm assembly" is used to indicate an assembly comprising a right crank arm and at least one front sprocket coupled with the right crank arm. The front sprocket, in particular, is the toothed wheel adapted to drive the chain of the bicycle for the motion transmission to the rear wheel of the bicycle, such motion being imparted by the cyclist through pedaling.

In conventional bicycles, the right crank arm is directly coupled with the front sprocket at respective surfaces defined on respective front faces of such components. In particular, defining as inner side of the crank arm and of the front sprocket the one intended to face, in use, towards the frame of the bicycle and as outer side the one opposite the inner side and intended to face, in use, towards the outside, the coupling between right crank arm and front sprocket typically takes place at one of the sides of the crank arm and at one of the sides of the front sprocket.

It has been observed that, in operation, the front sprocket elastically deforms due to the stresses to which it is subjected during pedaling. Such a deformation leads to a decrease in the transmission efficiency of the motion imparted through the crank arm assembly.

In particular, the crank arm transmits to the front sprocket the force that the cyclist exerts upon the pedals of the bicycle. Such a force acts in a plane parallel to the middle plane of the front sprocket and its direction of application and intensity change at each angular position of the pedal. This stress therefore causes a variable lateral flexing deformation of the front sprocket. Considering also that the chain exerts on a portion of the front sprocket a force opposing the forward movement of the front sprocket, the resulting stress on the front sprocket is a twisting stress. Therefore, the consequent deformation of the front sprocket is a twisting deformation.

Such a deformation occurs in all conventional front sprockets, even if they are made from metallic material, but it is rather accentuated in the case of front sprockets made from lightweight materials.

Indeed, it is known, above all in the field of racing bicycles, to use front sprockets made from light alloys, like for example aluminum alloys, and composite alloys, i.e. made partly from metallic material and partly from another material, like for example carbon fiber.

The right crank arm assemblies of the prior art typically comprise a star-shaped right crank arm. Such a crank arms comprise, in particular, a plurality of coupling arms having at respective free ends, a portion for fixing to the front sprocket.

The Applicant has found that, in order to reduce the overall weight of known assemblies to the minimum, the coupling arms of the crank arms and the corresponding coupling elements of the front sprockets are made with very low thickness, this causing the twisting of the front sprockets.

The Applicant has also found that, also in the case of strengthened crank arms, front sprockets made from light material still continue to bend a lot.

SUMMARY

The technical problem that the crank arm assembly seeks to overcome is to reduce as much as possible the twisting deformations of front sprockets associated with right crank arms, in particular of front sprockets made from light material, so as not to penalize the transmission efficiency of the motion imparted through the crank arm assembly.

The crank arm therefore relates, in a first aspect thereof, to a right crank arm assembly for a bicycle, comprising a right crank arm and at least one front sprocket coupled with said crank arm at least one first coupling portion of the crank arm, wherein said at least one front sprocket has an inner side intended, in use, to face towards the frame of the bicycle and an outer side opposite the inner side, said assembly further comprising at least one first crank arm element which acts in contact with said at least one front sprocket on one of said sides, wherein it comprises at least one second crank arm element which acts in contact with said at least one front sprocket on the other of said sides.

BRIEF DESCRIPTION OF THE DRAWING(S)

Further characteristics and advantages described herein shall become clearer from the following detailed description of some preferred embodiments thereof, made with reference to the attached drawings. In such drawings.

DETAILED DESCRIPTION OF THE PREFERRED EMBODIMENT(S)

Introduction

Figure 1:
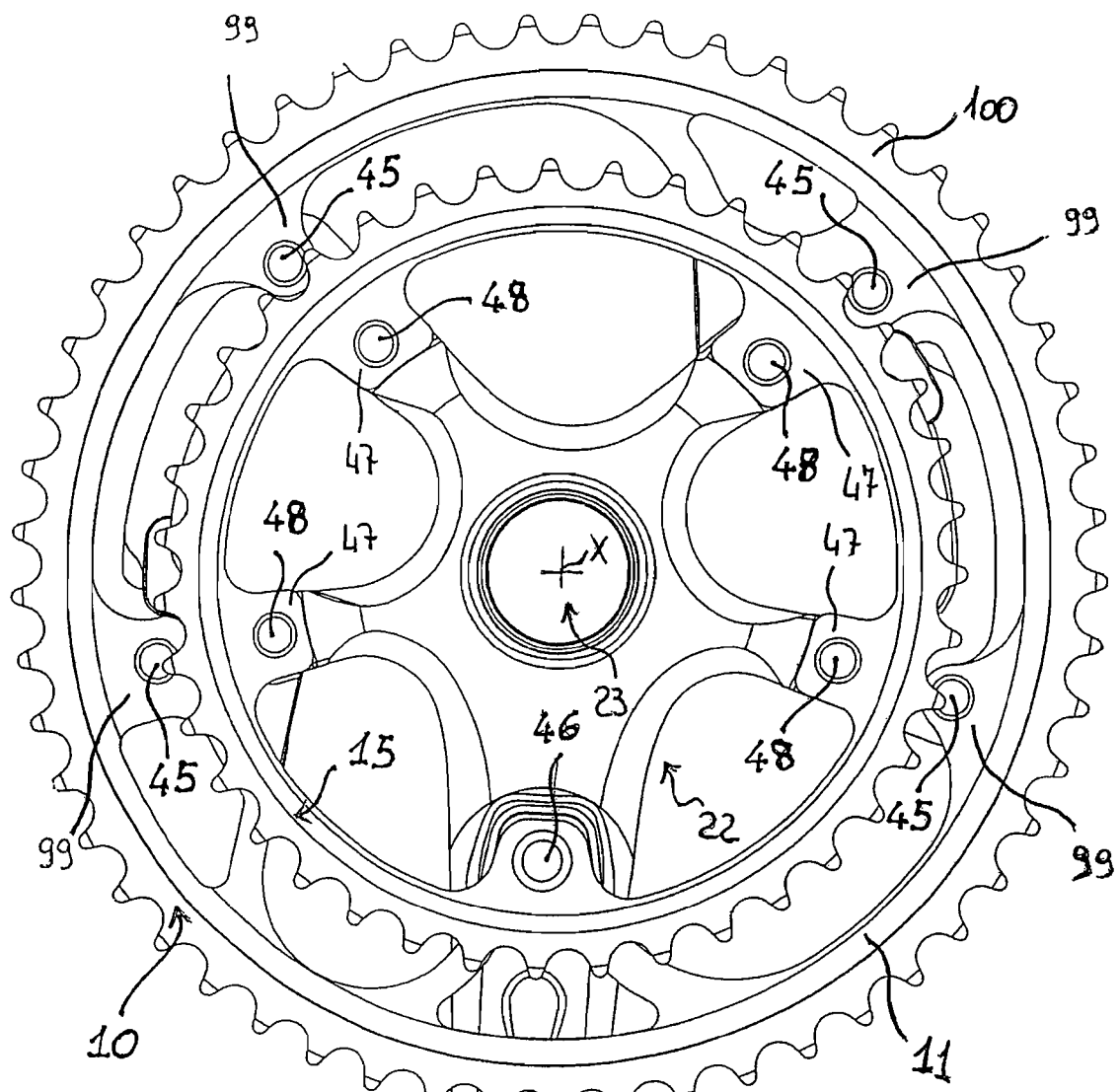
FIG. 1 is a front view from the inner side of a right crank arm assembly according to the present invention, comprising a combination of standard front sprockets.
Figure 1:
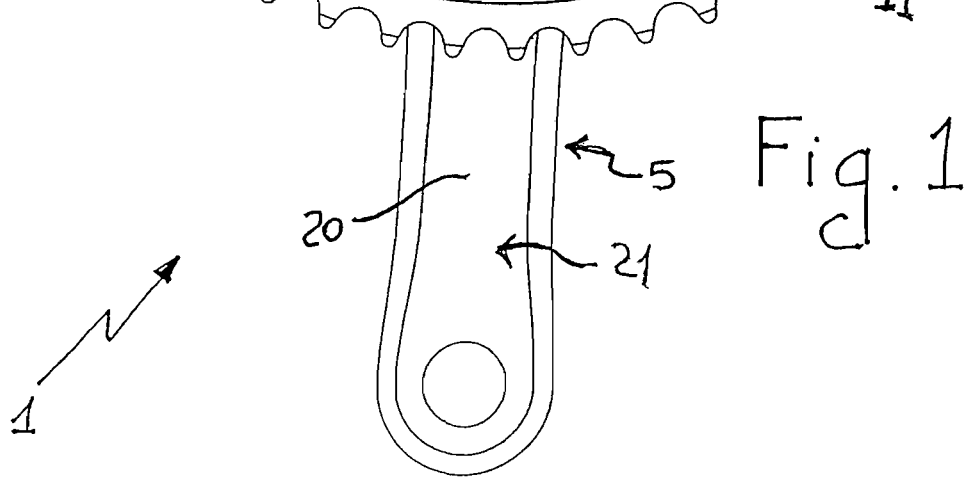

Advantageously, the provision in the crank arm of elements adapted to act in contact with the two opposite sides of the front sprocket effectively blocks the twisting deformation of the front sprocket during pedaling, to the great advantage of the transmission efficiency of the motion imparted through the right crank arm assembly described herein.

Preferably, the crank arm comprises a main body and said at least one first crank arm element and at least one second crank arm element are integral with the main body. However, an alternative embodiment of the assembly described herein is foreseen in which said at least one first crank arm element and at least one second crank arm element are distinct from, and associated with the main body of the crank arm.

Preferably, the coupling between front sprocket and crank arm at the aforementioned coupling portion is a dismountable coupling, so as to be able, if required or necessary, to replace the front sprocket or the crank arm for maintenance or repairs.

In the preferred embodiments of the assembly described herein, the crank arm comprises a plurality of first crank arm elements and a plurality of second crank arm elements. In particular, the crank arm elements are preferably at least two per side, possibly four, but embodiments with a different number, even an odd number, of crank arm elements are not excluded. Advantageously, the provision of many crank arm elements per side allows a contact between crank arm and front sprocket to be obtained that is particularly stable and effective in blocking the twisting deformation of the front sprocket.

Preferably, at least some of said at least one first crank arm element and at least one second crank arm element extend at least partially along respective non-radial directions with respect to a rotational axis of the crank arm. Advantageously, unlike assemblies of the prior art where contact occurs only at the ends of the arms of the crank arm extending radially with respect to the rotational axis of the crank arm, in the assembly described herein the contact between front sprocket and crank arm occurs at surfaces having a greater extension compared to the prior art. The desired stability and effectiveness of the contact between crank arm and front sprocket is thus ensured.

Preferably, at least some of said at least one first crank arm element and at least one second crank arm element extend at least partially circumferentially around said rotational axis of said crank arm, more preferably along respective arcs of circumference having an angular extension of less than 360°. Advantageously, in the crank arm of the assembly described herein, areas can in this way be identified in which the crank arm elements are not present. Such areas are used to allow and facilitate the insertion of the front sprocket between, and its removal from, the axial space defined on the crank arm between the first and the second crank arm elements. In this way it is possible to obtain the contact of the front sprocket with the crank arm at both sides of the front sprocket at the same time ensuring the removability of the coupling between front sprocket and crank arm to allow possible repair or replacement of the front sprocket or crank arm.

Preferably, such an angular extension is less than 360° and greater than or equal to 15°, more preferably it is between 15° and 100°, even more preferably between 30° and 75°.

Preferably, said at least one first crank arm element and at least one second crank arm element act in abutment onto said at least one front sprocket at different angular positions of the crank arm. The Applicant has indeed observed that, during pedaling, the front sprocket twists on different sides from one point to another. The Applicant has therefore thought to position, at each point of the front sprocket, crank arm elements only at the side in which the front sprocket twists. The crank arm elements are thus only positioned where they actually perform their counteraction to the twisting deformation of the front sprocket. In this way a substantial saving in weight of the crank arm is obtained in addition to an excellent result in terms of prevention of twisting deformation of the front sprocket.

Preferably, said at least one first crank arm element and at least one second crank arm element extend from opposite sides with respect to said at least one first coupling portion. The Applicant has indeed found that, with reference to a coupling portion with the crank arm, the front sprocket twists on opposite sides before and after such a coupling portion, and has thus thought to position the first crank arm elements on the opposite side to the second crank arm elements with respect to each coupling portion.

Even more preferably, said at least one second crank arm element is arranged in a position that precedes said at least one first coupling portion with reference to the direction of rotation of said crank arm during pedaling and said at least one first crank arm element is arranged in a position that follows said at least one first coupling portion with reference to said direction of rotation. The Applicant has indeed found that such a geometry provides effective opposition to the deformation of the front sprocket.

Preferably, the crank arm comprises at least one abutment surface adapted to allow the correct angular positioning of the crank arm with respect to said at least one front sprocket. More preferably, said at least one abutment surface is defined at least partially in said at least one second crank arm element. Advantageously, it is in this way possible to obtain the correct angular positioning of the crank arm with respect to the front sprocket without needing to provide special abutment elements. Moreover, the abutment surfaces advantageously constitute additional means for making the front sprocket rotate. Indeed, thanks to the provision of the aforementioned abutment surfaces the right crank arm assembly described herein would be able to transmit torque in the direction of pedaling even if the front sprocket is not fixed to the right crank arm through proper screws.

Even more advantageously, the provision of the abutment surfaces ensures that when the front sprocket is in abutment onto the crank arm, the first and second crank arm elements cooperate to hold the front sprocket in the axial space defined between them, thus leaving both of the operator's hands free, who can thus easily screw in the screws to firmly couple the front sprocket with the crank arm.

In a particularly preferred embodiment thereof, the assembly described herein comprises a first front sprocket having a first diameter and at least one second front sprocket having a second diameter different to the first diameter, wherein the first front sprocket is coupled with the crank arm at said at least one first coupling portion and said at least one second front sprocket is coupled with the crank arm at least one second coupling portion different from said at least one first coupling portion.

Advantageously, the provision on the crank arm of different coupling portions for the different front sprockets makes the removal of the front sprockets for possible repairs or replacement quicker and easier. This cannot be obtained in assemblies of the prior art, wherein all of the front sprockets are coupled with the crank arms at the same coupling portions of the crank arm.

Even more preferably, said at least one first coupling portion is defined at a first circumference having its centre at the rotational axis of the crank arm and said at least one second coupling portion is defined at least one second circumference concentric to the first circumference and having a different diameter to that of the first circumference.

Advantageously, the provision of front sprockets of different diameter coupled at different coupling portions of the crank arm allows a large number of combinations of front sprockets of different size to be made, such combinations also comprising very small front sprockets and very big front sprockets. In this respect, it should be noted that, in conventional assemblies, the only combinations used are those known as "standard", comprising small front sprockets with a number of teeth of between 38 and 44 and large front sprockets with a number of teeth of between 52 and 56, and "compact", comprising small front sprockets with a number of teeth of between 32 and 36 and large front sprockets with a number of teeth of between 46 and 50. The assembly described herein, on the other hand, allows different combinations to "standard" or "compact" to be adopted, like for example mixed combinations.

The Applicant has also found that, in conventional crank arms, the arms are sized to give the maximum resistance to twisting in combination with front sprockets of predetermined size. The result of this is that, in the case in which the cyclist intends to use front sprockets of different sizes and wants to maintain an acceptable structural rigidity, he is forced to replace also the right crank arm. This, as well as constituting a trouble for the cyclist, implies that the crank arm manufacturer needs to design, manufacture and commercialize crank arms of different sizes.

Advantageously, with an assembly like the one described herein in which front sprockets of different diameter are coupled at different coupling portions of the crank arm, it is no longer necessary to produce different sized crank arms for each combination of front sprockets intended to be used, nor does the cyclist have to change the crank arm each time he changes the combination of front sprockets in order to be able to maintain the desired structural rigidity. The present invention is therefore advantageous both for the cyclist and for the crank arm manufacturer.

Preferably, said at least one first coupling portion is defined along at least one first substantially radial direction with respect to said rotational axis of the crank arm and said at least one second coupling portion is defined along at least one second substantially radial direction different from said first substantially radial direction.

Even more preferably, the assembly described herein comprises at least two first coupling portions arranged at a first predetermined angular distance one from the other and at least two second coupling portions arranged at a second predetermined angular distance one from the other, the second predetermined angular distance being shorter than the first predetermined angular distance.

In the preferred embodiment of the assembly described herein, the main body of the crank arm comprises a first body portion that couples with a bicycle pedal and a second body portion that couples with said at least one front sprocket and with a shaft of a bottom bracket assembly of a bicycle, wherein said second body portion comprises at least one arm that couples with said at least one front sprocket extending substantially radially with respect to a rotational axis of the crank arm, wherein said at least one first coupling portion is defined in said at least one coupling arm and wherein said at least one first crank arm element and at least one second crank arm element extend from said at least one coupling arm along non-radial directions on opposite sides with respect to said at least one first coupling portion.

Preferably, the crank arm comprises a plurality of coupling arms and said at least one first crank arm element and at least one second crank arm element extend from at least some of said coupling arms.

In particular, in a first particularly preferred embodiment of the assembly described herein, said at least one second crank arm element extends cantilevered from a respective coupling arm and, preferably, said at least one first crank arm element extends circumferentially without structural interruption between two adjacent coupling arms. More preferably, said at least one second crank arm element extends cantilevered from the coupling arm of said two adjacent coupling arms that precedes the other coupling arm with reference to the direction of rotation of the crank arm during pedaling.

However, an embodiment is foreseen in which said at least one first crank arm element extends cantilevered from a respective coupling arm.

Preferably, in the case in which the assembly described herein comprises more than one front sprocket, said at least one second coupling portion is also defined in said at least one coupling arm. It is not therefore necessary to provide coupling elements in the crank arm other than those already provided for the coupling with the first front sprocket, to the great advantage of the weight of the crank arm.

Preferably, the crank arm further comprises an additional coupling portion defined in said first body portion, said first front sprocket and at least one second front sprocket both being coupled with said crank arm at said additional coupling portion. In this way a stable coupling of the front sprockets with the crank arm is achieved without weakening the body of the crank arm by providing many coupling points therein.

Preferably, the crank arm is made from light metal material or, more preferably, from composite material. In the latter case, the crank arm elements are also made from composite material, so as to obtain a component which is particularly light in weight.

Preferably, the assembly described herein comprises at least one first front sprocket element that cooperates with said at least one first crank arm element and at least one second front sprocket element that cooperates with said at least one second crank arm element.

More preferably, said at least one first front sprocket element has an angular extension substantially equal to that of said at least one first crank arm element. Advantageously, the front sprocket is thus provided with extended contact elements that give the front sprocket itself a certain rigidity and that thus allow the front sprocket to be made lighter in weight.

Preferably, said at least one front sprocket comprises an annular element having a radially inner surface from which at least one coupling element with the crank arm extends cantilevered.

In a preferred embodiment of the assembly described herein, said at least one first front sprocket element and at least one second front sprocket element are defined in a body portion of said annular element extending radially cantilevered from said radially inner surface and comprising said at least one coupling element.

In an alternative embodiment of the assembly described herein, said at least one second front sprocket element is defined by a respective body portion of said annular element extending radially cantilevered from said radially inner surface, said respective body portion not comprising said at least one coupling element.

Preferably, said annular element comprises a toothed portion that extends radially towards the outside along a primitive circumference having a predetermined diameter T, and said at least one first front sprocket element and at least one second front sprocket element are entirely contained in a first area extending radially towards the outside starting from an ideal circumference having a diameter T'≧aT, where a has a value selected from ⅔, ¾, ⅘, ⅚ or ⁶⁄₇. Advantageously, the front sprocket in this case is reduced to a simple toothed band provided with contact and coupling elements with the crank arm having a very short radial extension.

Preferably, the annular element of the front sprocket is made from light metal material or composite material. In this way a component which is particularly light in weight is obtained.

In a second aspect thereof, the present invention relates to a right crank arm for a bicycle, comprising a main body adapted to be coupled with at least one front sprocket of a crankset for a bicycle at least one first coupling portion of the main body, said at least one front sprocket having an inner side intended, in use, to face towards the frame of the bicycle and an outer side opposite the inner side, the main body comprising at least one first contact element adapted to act on said at least one front sprocket on one of said sides, the crank arm being wherein the main body comprises at least one second contact element adapted to act on said at least one front sprocket on the other of said sides.

Throughout the present description and in the subsequent claims, the contact elements described with reference to the crank arm correspond to the elements indicated previously as crank arm elements.

Advantageously, the right crank arm described above can be used in the right crank arm assembly discussed above with reference to the first aspect described herein, thus allowing the advantages mentioned above with reference to such a crank arm assembly to be achieved.

Preferably, the right crank arm described above comprises individually and/or in combination all of the structural and functional features (be they essential, preferred and/or advantageous features) described above with reference to the crank arm of the right crank arm assembly described herein.

In particular, preferably, said at least one first contact element and at least one second contact element are integral with the main body. However, an embodiment is foreseen in which said at least one first contact element and at least one second contact element are distinct from, and associated with, said main body.

Preferably, the main body of the crank arm comprises a plurality of first contact elements and a plurality of second contact elements.

Preferably, at least some of said at least one first contact element and at least one second contact element extend at least partially along respective non-radial directions with respect to a rotational axis of said crank arm.

Preferably, at least some of said at least one first contact element and at least one second contact element extend at least partially circumferentially around said rotational axis of said crank arm, more preferably along respective arcs of circumference having an angular extension of less than 360°.

Preferably, such an angular extension is less than 360° and greater than or equal to 15°, more preferably it is between 15° and 100°, even more preferably between 30° and 75°.

Preferably, said respective arcs of circumference have different angular positions with respect to said rotational axis.

Preferably, said at least one first contact element and at least one second contact element extend from opposite sides with respect to said at least one first coupling portion.

More preferably, said at least one second contact element is arranged in a position that precedes said at least one first coupling portion with reference to the direction of rotation of the crank arm during pedaling and said at least one first contact element is arranged in a position that follows said at least one first coupling portion with reference to said direction of rotation.

Preferably, the main body of the crank arm comprises at least one abutment surface adapted to allow the correct angular positioning of said crank arm with respect to said at least one front sprocket.

More preferably, said at least one abutment surface is defined at least partially in said at least one second contact element.

Preferably, the main body of the crank arm comprises at least one first coupling portion with a first front sprocket of a crankset for a bicycle and at least one second coupling portion with at least one second front sprocket of a crankset for a bicycle having a different diameter from the diameter of said at least one first front sprocket, wherein said at least one second coupling portion is different from said at least one first coupling portion.

Preferably, said at least one first coupling portion is defined at a first circumference having its centre at the rotational axis of said crank arm and said at least one second coupling portion is defined at least one second circumference concentric with said first circumference and having a diameter different to that of said first circumference.

Preferably, said at least one first coupling portion is defined along at least one first substantially radial direction with respect to said rotational axis and said at least one second coupling portion is defined along at least one second substantially radial direction different from said first substantially radial direction.

Preferably, the main body of the crank arm comprises at least two first coupling portions arranged at a first predetermined angular distance one from the other and at least two second coupling portions arranged at a second predetermined angular distance one from the other, said second predetermined angular distance being shorter than said first predetermined angular distance.

Preferably, the main body of the crank arm comprises a first body portion that couples with a bicycle pedal and a second body portion that couples with said at least one front sprocket and with a shaft of a bottom bracket assembly of a bicycle, wherein said second body portion comprises at least one coupling arm with said at least one front sprocket extending substantially radially with respect to a rotational axis of said crank arm, wherein said at least one first coupling portion is defined in said at least one coupling arm and said at least one first contact element and at least one second contact element extend from said at least one coupling arm along non-radial directions on opposite sides with respect to said at least one coupling portion.

Preferably, said main body comprises a plurality of coupling arms and said at least one first contact element and at least one second contact element extend from at least some of said coupling arms.

In particular, in a first particularly preferred embodiment of the crank arm described herein, said at least one second contact element extends cantilevered from a respective coupling arm and, preferably, said at least one first contact element extends circumferentially without any structural interruption between two adjacent coupling arms. More preferably, said at least one second contact element extends cantilevered from the coupling arm of said two adjacent coupling arms that precedes the other coupling arm with reference to the direction of rotation of the crank arm during pedaling.

However, an embodiment is foreseen in which said at least one first contact element extends cantilevered from a respective coupling arm.

Preferably, in the case in which the crank arm described herein is adapted to be coupled with at least two front sprockets, said at least one second coupling portion is also defined in said at least one coupling arm.

Preferably, the main body of the crank arm is made from light metal material or from composite material.

In a third aspect thereof, the present invention relates to a front sprocket for a crankset of a bicycle, comprising an annular element having at least one coupling portion with a right crank arm of a bicycle, said crank arm having an inner side intended, in use, to face towards the frame of the bicycle and an outer side opposite said inner side, said annular element comprising at least one first contact element adapted to act in abutment on said crank arm on one of said sides, wherein said annular element comprises at least one second contact element adapted to act in abutment on said crank arm on the other of said sides.

Throughout the present description and in the subsequent claims, the contact elements described with reference to the front sprocket correspond to the element indicated previously as front sprocket elements.

Advantageously, the front sprocket described above can be used in the right crank arm assembly discussed above with reference to the first aspect described herein and therefore allows the advantages mentioned above with reference to such a crank arm assembly to be obtained.

Preferably, the front sprocket described herein comprises individually and/or in combination all of the structural and functional features (be they essential, preferred and/or advantageous features) described with reference to the front sprocket of the right crank arm assembly of the first aspect described herein.

In particular, said annular element preferably comprises a plurality of first contact elements and a plurality of second contact elements.

Preferably, said at least one first contact element and at least one second contact element extend at least partially along respective non-radial directions with respect to a rotational axis of said front sprocket.

More preferably, said at least one first contact element and at least one second contact element extend at least partially circumferentially around said rotational axis of said front sprocket along respective arcs of circumference having an angular extension of less than 360°.

Preferably, said angular extension is less than 360° and greater than or equal to 15°, more preferably it is between 15° and 100°, even more preferably between 30° and 75°.

Even more preferably, said respective arcs of circumference have different angular positions with respect to said rotational axis.

Preferably, said at least one first contact element and at least one second contact element extend from opposite sides with respect to said at least one coupling portion.

More preferably, said at least one second contact element is arranged in a position that precedes said at least one coupling portion with reference to the direction of rotation of the front sprocket during pedaling and said at least one first contact element is arranged in a position that follows said at least one coupling portion with reference to said direction of rotation.

Preferably, said annular element comprises at least one abutment surface adapted to allow the correct angular positioning of said front sprocket with respect to said crank arm.

More preferably, said at least one abutment surface is defined at least partially in said at least one second contact element.

Preferably, said annular element comprises a radially inner surface from which at least one element for coupling with said crank arm extends radially, said at least one coupling portion being defined in said at least one coupling element.

In a first embodiment of the front sprocket described herein, said at least one first contact element and at least one second contact element are defined in a body portion of said annular element extending radially cantilevered from said radially inner surface and comprising said at least one coupling element.

In an alternative embodiment of the front sprocket described herein, said at least one second contact element is defined by a respective body portion of said annular element extending radially cantilevered from said radially inner surface, said respective body portion not comprising said at least one coupling element.

Preferably, said at least one first contact element extends circumferentially without structural interruption between two adjacent coupling elements.

Preferably, said annular element comprises a toothed portion that extends radially towards the outside along a primitive circumference having a predetermined diameter T, wherein said at least one first contact element and at least one second contact element are entirely contained in a first area extending radially towards the outside starting from an ideal circumference having a diameter $T' \geq aT$, where a has a value selected from $\frac{2}{3}$, $\frac{3}{4}$, $\frac{4}{5}$, $\frac{5}{6}$ or $\frac{6}{7}$.

Preferably, said annular element is made from a light metal alloy or composite alloy.

In a fourth aspect thereof, the present invention relates to a right crank arm assembly for a bicycle, comprising a right crank arm and at least one front sprocket coupled with said crank arm, wherein it comprises at least one crank arm element which acts in contact with said at least one front sprocket and that extends along a non-radial direction with respect to a rotational axis of said crank arm.

Advantageously, the provision in the crank arm of contact elements extending along a non-radial direction allows a contact of the crank arm on the front sprocket to be obtained that is more stable and effective than what occurs in the assemblies of the prior art, where the contact occurs only at the ends of the arms of the crank arm extending radially with respect to the rotational axis of the crank arm. In this way it is possible to limit the deformation of the front sprocket, with a consequent advantage in terms of motion transmission.

Preferably, the assembly discussed above with reference to the fourth aspect described herein comprises individually and/or in combination all of the features described above with reference to the assembly of the first aspect described herein, thus achieving all of the advantages discussed above with reference to such an assembly.

In particular, preferably, the crank arm of the assembly of the fourth aspect described herein comprises at least one coupling arm with said at least one front sprocket extending along a substantially radial direction, wherein said at least one crank arm element extends from said at least one coupling arm.

More preferably, the crank arm comprises a plurality of coupling arms, wherein said at least one crank arm element extends from at least some of said coupling arms.

Preferably, said at least one crank arm element extends at least partially circumferentially around said rotational axis of said crank arm along an arc of circumference having a predetermined angular extension.

In a specific embodiment of the assembly described herein, such an angular extension is equal to 360°.

In an alternative embodiment, such an angular extension is less than 360° and greater than or equal to 15, and is preferably between 15° and 100°, more preferably between 30° and 75°.

As already stated with reference to the crank arm assembly discussed above with reference to the first aspect described herein, said at least one crank arm element extends circumferentially without structural interruption between two adjacent coupling arms. However, a variant is foreseen in which said at least one crank arm element extends cantilevered from said at least one coupling arm.

Preferably, said at least one front sprocket has an inner side intended, in use, to face towards the frame of the bicycle and an outer side opposite said inner side and said at least one crank arm element is active on said at least one front sprocket on said outer side.

Preferably, said crank arm is made from light metal material or from composite material.

Preferably, the assembly described herein comprises at least one front sprocket element that cooperates with said at least one crank arm element, wherein said at least one front sprocket element has an angular extension substantially equal to that of said at least one crank arm element.

Preferably, said at least one front sprocket comprises an annular element having a radially inner surface from which at least one coupling element with said crank arm extends radially cantilevered.

Preferably, said at least one coupling element is structurally distinct from said at least one front sprocket element.

Preferably, said annular element comprises a toothed portion that extends radially towards the outside along a primitive circumference having a predetermined diameter T, wherein said at least one front sprocket element and said at least one coupling element are entirely contained in a first area extending radially towards the outside starting from an ideal circumference having a diameter $T' \geq aT$, where a has a value selected from $2/3$, $3/4$, $4/5$, $5/6$ or $6/7$.

Preferably, said annular element is made from light metal material or from composite material.

In a fifth aspect thereof, the present invention relates to a right crank arm for a bicycle, comprising a main body adapted to be coupled with at least one front sprocket of a crankset of a bicycle, wherein said main body comprises at least one contact element with said at least one front sprocket that extends along a non-radial direction with respect to a rotational axis of said crank arm.

Throughout the present description and in the subsequent claims, the contact elements described with reference to the crank arm correspond to the elements indicated previously as crank arm elements.

Advantageously, the crank arm described above can be used in the right crank arm assembly discussed above with reference to the fourth aspect described herein, and thus allows the advantages mentioned above with reference to such a crank arm assembly to be achieved.

Preferably, the crank arm described herein comprises individually and/or in combination all of the structural and functional features (be they essential, preferred and/or advantageous features) described with reference to the crank arm of the right crank arm assembly of the fourth aspect described herein.

In a sixth aspect thereof, the present invention relates to a front sprocket for a crankset of a bicycle, comprising an annular element adapted to be coupled with a right crank arm of a bicycle, wherein said annular element comprises at least one contact element with said crank arm extending along a non-radial direction with respect to a rotational axis of said front sprocket.

Throughout the present description and in the subsequent claims, the contact elements described with reference to the front sprocket correspond to the elements indicated previously as front sprocket elements.

Advantageously, the front sprocket described above can be used in the right crank arm assembly discussed above with reference to the fourth aspect described herein, and therefore allows the advantages mentioned above with reference to such a crank arm assembly to be achieved.

Preferably, the front sprocket described herein comprises individually and/or in combination all of the structural and functional features (be they essential, preferred and/or advantageous features) described with reference to the front sprocket of the right crank arm assembly of the fourth aspect described herein.

In a seventh aspect thereof, the present invention relates to a right crank arm assembly for a bicycle, comprising a right crank arm and at least one front sprocket coupled with said crank arm at least one coupling portion of said at least one front sprocket, wherein it comprises at least one front sprocket portion which acts in contact with said crank arm and which is structurally distinct from said at least one coupling portion.

Advantageously, the provision in the front sprocket of contact portions which are structurally distinct from the coupling portions allows a contact of the crank arm to be made on the front sprocket that is more stable and effective that what occurs in the assemblies of the prior art, where the contact only occurs at the ends of the arms of the crank arm extending radially with respect to the rotational axis of the crank arm. In this way it is possible to limit the deformation of the front sprocket, with a consequent advantage in terms of transmission of motion.

Preferably, the assembly discussed above with reference to the seventh aspect described herein comprises individually and/or in combination all of the structural and functional features discussed above with reference to the assembly of the first aspect described herein, thus obtaining all of the advantages discussed above with reference to this assembly.

In particular, preferably, said at least one front sprocket portion is defined in at least one front sprocket element that extends radially cantilevered from a radially inner surface of said at least one front sprocket and said at least one coupling portion is defined in at least one first coupling element that extends radially cantilevered from said radially inner surface in a different angular position to that of said at least one front sprocket element.

Preferably, said front sprocket comprises an annular element made from a light metal material or from a composite material.

Preferably, said annular element comprises a toothed portion that extends radially towards the outside along a primitive circumference having a predetermined diameter T, wherein said at least one front sprocket element and said at least one first coupling element are entirely contained in a first area extending radially towards the outside starting from an ideal circumference having a diameter $T' \geq aT$, where a has a value selected from $2/3$, $3/4$, $4/5$, $5/6$ or $6/7$.

Preferably, the assembly described herein comprises at least one crank arm element adapted to cooperate with said at least one front sprocket element and at least one second coupling element adapted to cooperate with said at least one first coupling element.

Preferably, said crank arm is made from a light metal material or from a composite material.

In an eighth aspect thereof, the present invention relates to a front sprocket for a crankset of a bicycle, comprising an annular element adapted to be coupled with a right crank arm of a bicycle at a coupling portion of said annular element, wherein said annular element comprises at least one contact portion with said crank arm which is structurally distinct from said at least one coupling portion.

Throughout the present description and in the subsequent claims, the contact elements described with reference to the front sprocket correspond to the elements indicated previously as front sprocket elements.

Advantageously, the front sprocket described above can be used in the right crank arm assembly discussed above with reference to the seventh aspect described herein, and thus allows the advantages mentioned above with reference to such a crank arm assembly to be obtained.

Preferably, the front sprocket described herein comprises individually and/or in combination all of the structural and functional features (be they essential, preferred and/or advantageous features) described with reference to the front sprocket of the right crank arm assembly of the seventh aspect described herein.

DESCRIPTION

Figure 2:
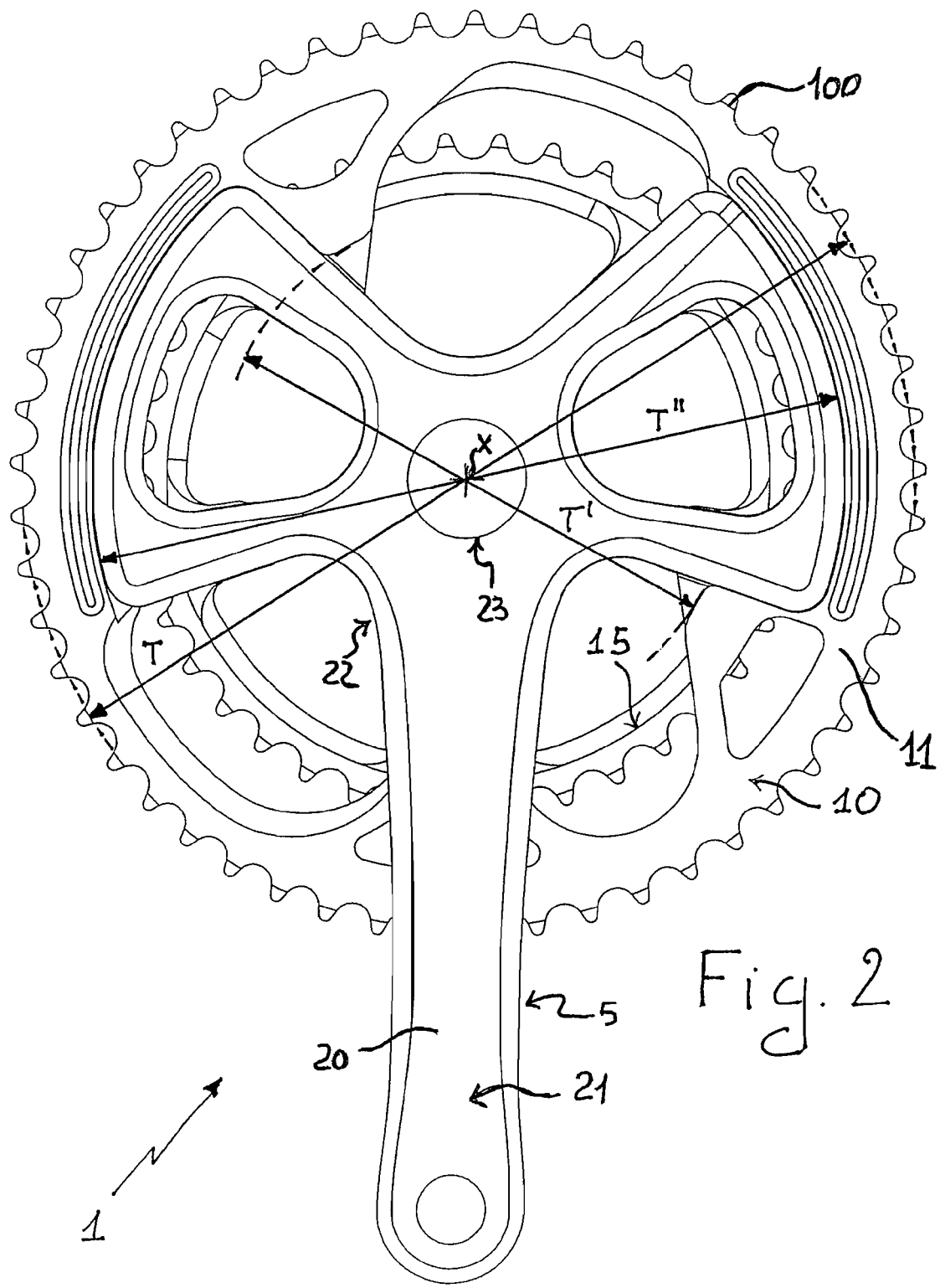
FIG. 2 is a front view of the outer side of the assembly of FIG. 1.

With reference to FIGS. 1 and 2, a first embodiment of a right crank arm assembly according to the present invention is indicated with 1. The assembly 1 comprises a right crank arm 5, a front sprocket of larger diameter 10 (hereafter indicated as big front sprocket) and a front sprocket of smaller diameter 15 (hereafter indicated as small front sprocket). Alternative and not illustrated embodiments are foreseen in which the assembly 1 comprises just one front sprocket, for example for use on a racing track, or more than two front sprockets, for example three.

Figure 3:
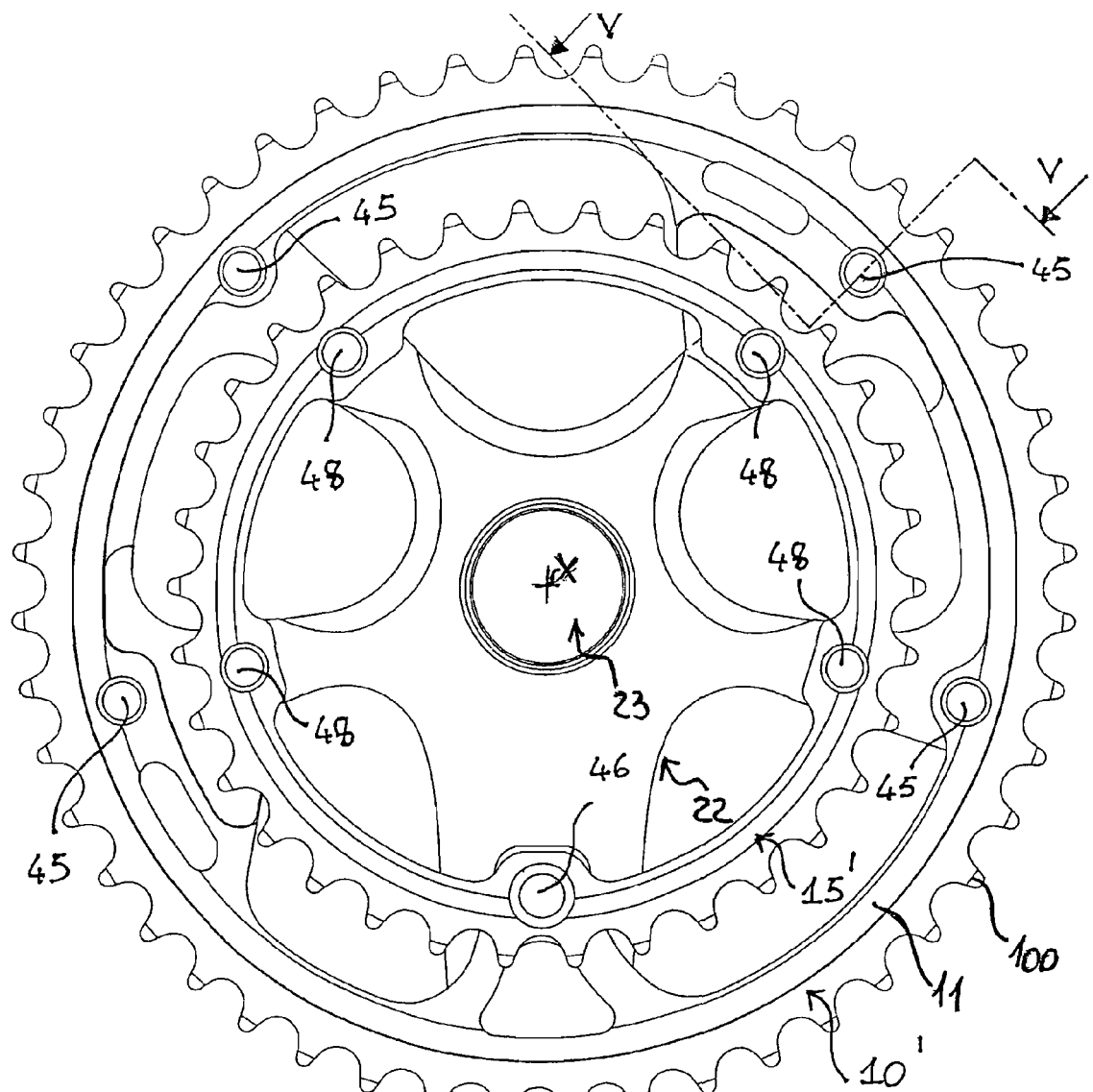
FIG. 3 is a front view of the inner side of a right crank arm assembly according to the present invention, comprising a combination of compact-type front sprockets.
Figure 3:
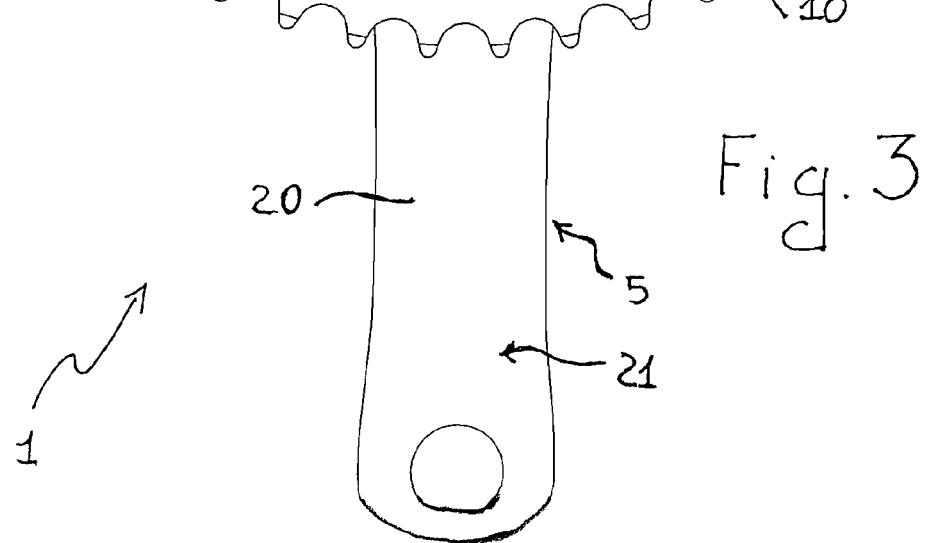

Throughout the present description and in the subsequent claims, the "inner side" of the assembly 1, of the crank arm 6 and/or of the front sprockets 10 and 15 shall indicate the side visible in FIGS. 1 and 3, i.e. the one facing towards the frame of the bicycle when the assembly 1 is mounted in the bottom bracket assembly. On the other hand "outer side" shall indicate the side opposite the inner side, visible in FIGS. 2 and 4.

Throughout the present description and in the subsequent claims, moreover, "previous position" or "following position" shall respectively indicate the position of an element that precedes and that follows a reference element in the direction of rotation of the crank arm, where the rotation is in the direction such as to transmit driving force to the rear wheel.

The right crank arm 5 described herein can be made from metallic material, like a light alloy, or from composite material, comprising structural fibers incorporated in a polymeric material. Typically, the structural fibers are selected from the group consisting of carbon fibers, glass fibers, aramid fibers, ceramic fibers, boron fibers and combinations thereof, carbon fibers being preferred. Preferably, the polymeric material of the body of the component is thermosetting. However, the possibility of using a thermoplastic material is not excluded. More preferably, the polymeric material comprises an epoxy resin. While these materials are preferred, they are not limiting to other materials that may be chosen.

The arrangement of said structural fibers in the polymeric material can be a random arrangement of pieces or sheets of structural fibers, a substantially unidirectional ordered arrangement of fibers, a substantially bidirectional ordered arrangement of fibers, or a combination of the above.

In an alternative embodiment, the fibers are organized in a fabric wound with continuity around a recess, as described in patent EP 1270394 and in European patent applications n° 06425086 and 06425087 (U.S. application Ser. Nos. 11/675,279 and 11/501,656) to the same Applicant the content of which are incorporated herein by reference as if fully set forth.

Figure 6:
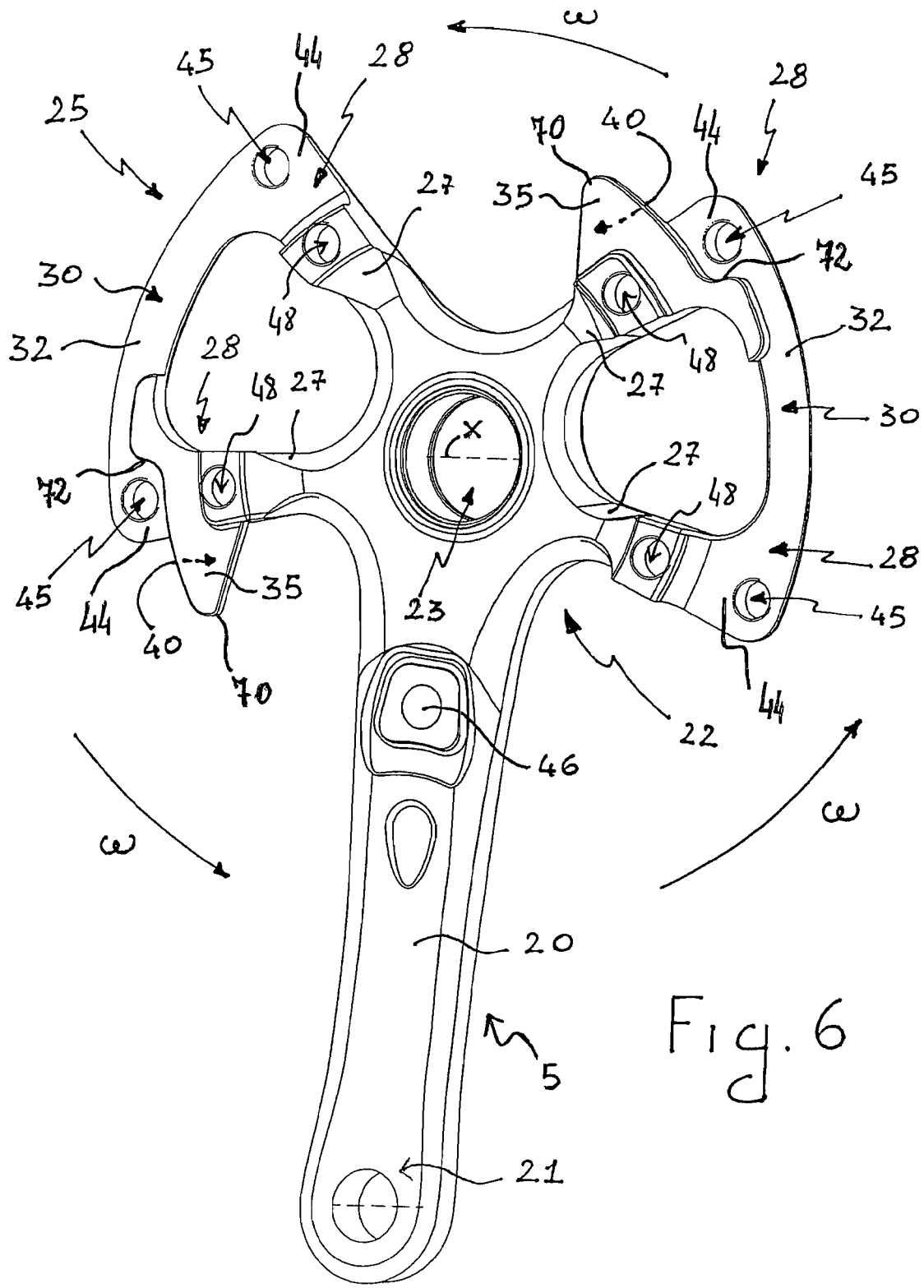
FIGS. 6 to 8 are respectively a perspective view, a view of the inner side and a view of the outer side of a right crank arm according to the present invention, such a crank arm being used in the assembly of FIG. 1.
Figure 7:
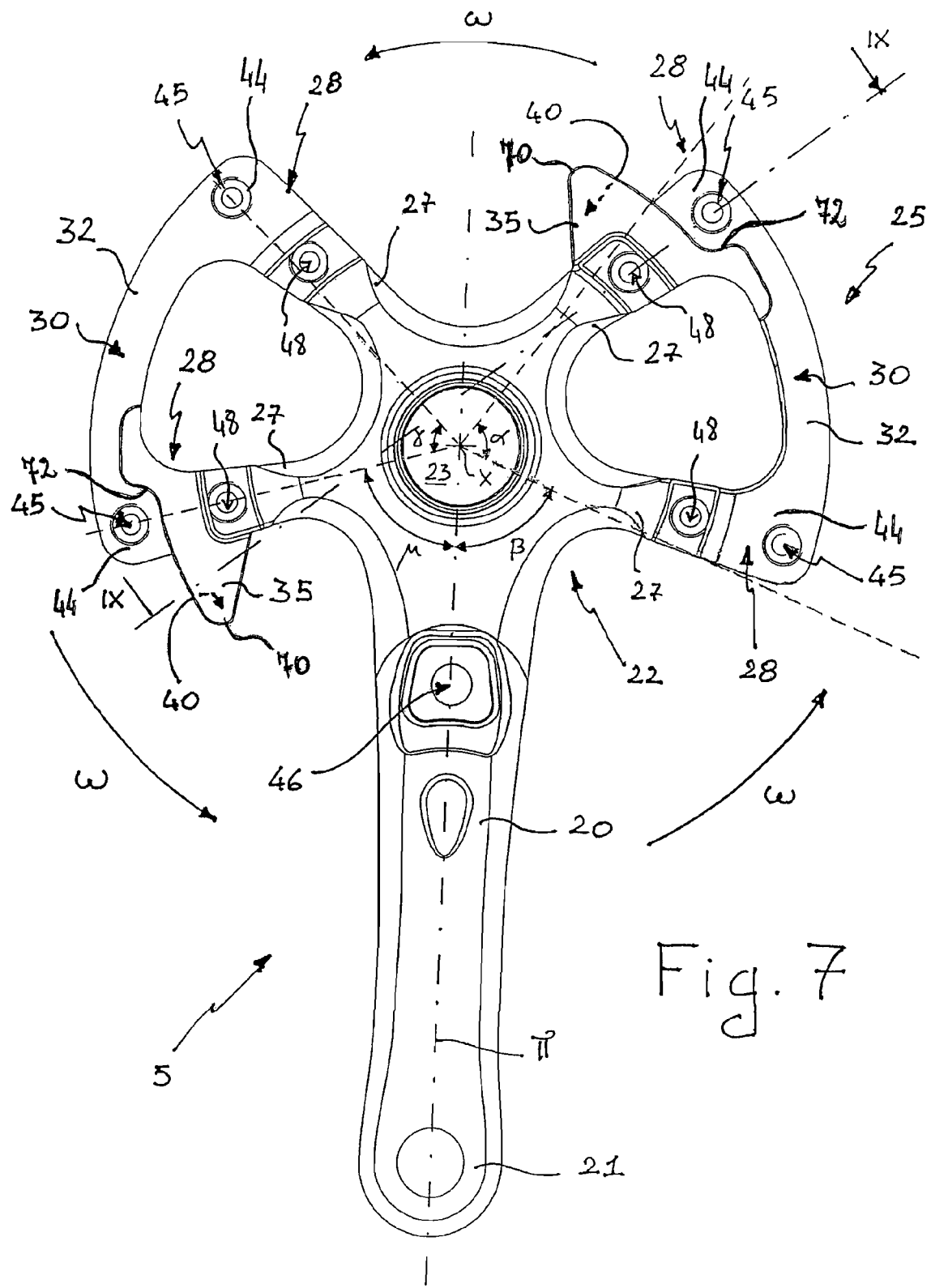
Figure 8:
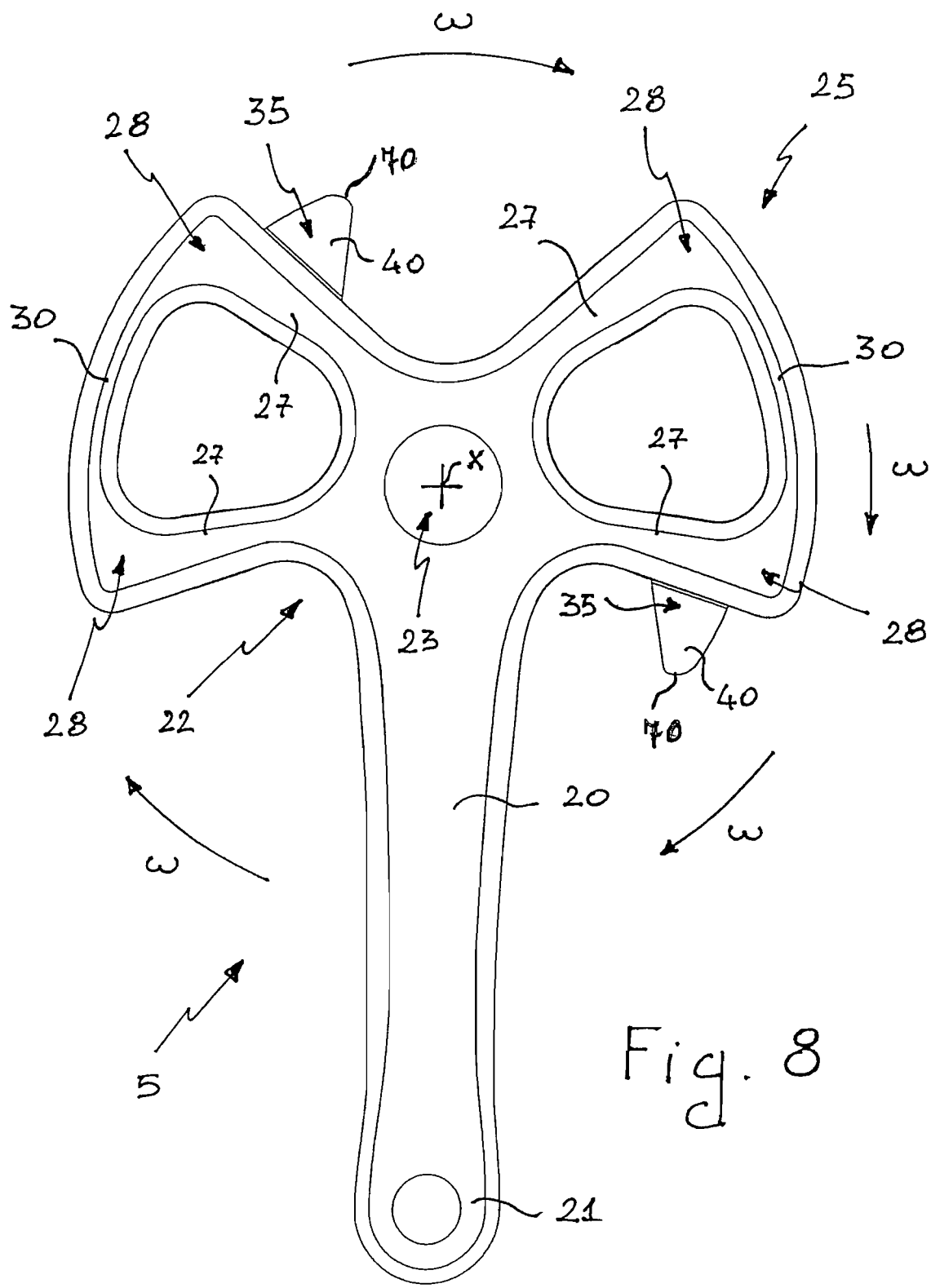

With particular reference to FIGS. 6 to 8, the right crank arm 5 comprises a main body 20 having a first end 21 for coupling with a pedal (not illustrated) and a second end 22 for coupling with the front sprockets 10 and 15 and with a shaft of a bottom bracket assembly (not illustrated). In particular, the second end 22 comprises a hole 23 for housing the shaft of the bottom bracket assembly. In alternative and not illustrated embodiments but known to a person of ordinary skill in the art, the shaft is removably coupled with the right crank arm, or it is an integral part thereof.

A support structure 25 of the front sprockets 10 and 15 is provided about the hole 23, comprising four coupling arms (or spokes) 27 that extend substantially radially around the hole 23 inside of which a rotational axis X of the crank arm 5 is defined.

At the respective free end portions 28 the arms 27 are connected in sets of two by a reinforcing element 30, preferably extending circumferentially around the rotational axis X of the crank arm 5 and made in the form of an arc of circle.

Each reinforcing element 30 that connects a pair of arms 27 comprises a contact surface 32 at the outer side of the big front sprocket 10.

The contact surfaces 32 preferably have an angular extension $\alpha$ (FIG. 7) greater than or equal to 15°, preferably between 15° and 100°, more preferably between 30° and 75° and are arranged at an angular distance $\beta$ from the middle plane $\Pi$ of the elongated body 20, where $\beta$ is preferably between 30° and 90°.

In an alternative embodiment of the crank arm 5 (not illustrated) the pairs of arms 27 connected by the element 30 are replaced by a single arm of equal angular extension.

Now considering the pairs of arms 27 connected together by the element 30, the arm 27 of each of them coming first in the direction of rotation $\omega$ of the right crank arm 5 around the rotational axis X of the crank arm 5, comprises an element 35 extending cantilevered in the circumferential direction in the direction of rotation $\omega$. Each element 35 comprises a contact surface 40 at the inner side of the big front sprocket 10.

Coupling portions 44 with the big front sprocket 10 are defined at the free ends 28 of each arm 27. The element 30 connects the coupling arms 27 right at such coupling portions 44. The coupling portions 44 are provided with coupling holes 45.

The coupling portions 44 with the ends 28 of the arms 27 connected by the element 30 are arranged at an angular distance $\gamma$ from each other of between 45° and 95°, and the coupling portion 44 closest to the elongated body 20 is arranged at an angular distance $\mu$ of between 35° and 85° from the plane $\Pi$.

An additional coupling hole 46 with the front sprocket 10 is preferably provided on a portion of the elongated body 20 (FIG. 7).

Figure 9:
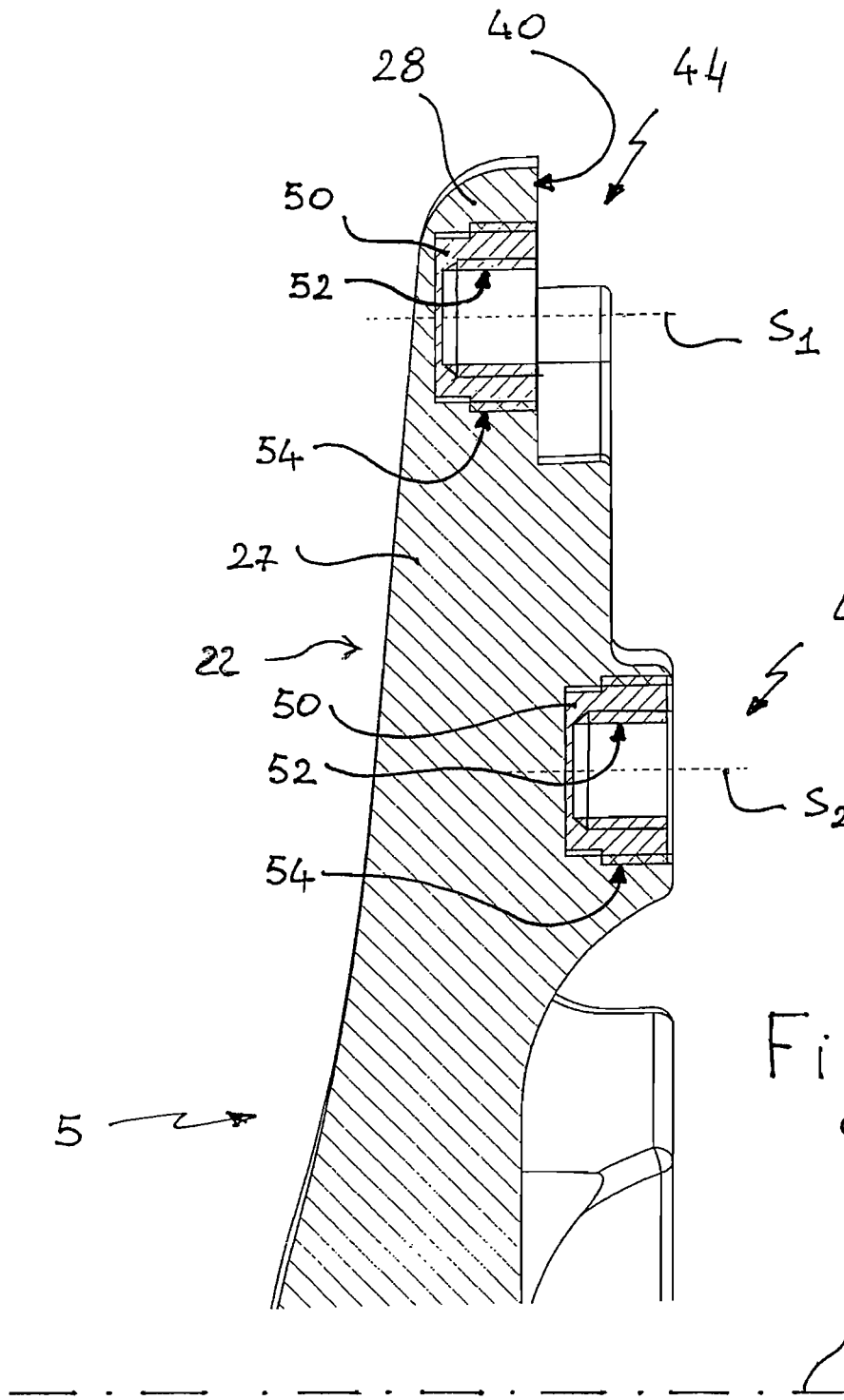
FIG. 9 is an enlarged section view according to the line IX-IX of FIG. 7.

The section of FIG. 9 shows in detail an example embodiment of the coupling portions 44 in the case in which the right crank arm 5 is made from composite material. The coupling portions 44 are in this case preferably defined by metallic inserts 50 provided with a threaded hole 52 for the insertion of a screw (not illustrated). The outer surface 54 of the inserts 50 is irregular, and preferably threaded, so as to be able to be better held in the composite material, to which it is fixed by gluing or by direct adhesion due to a co-moulding process.

An alternative embodiment of the assembly described herein is foreseen in which the threaded hole 52 is directly made in the composite material.

As shown in detail in FIG. 9, the crank arm 5 described herein further comprises, in a preferred embodiment thereof, second coupling portions 47 used for the coupling of the small front sprocket 15. The coupling portions 47 are preferably made identical to the coupling portions 44 and comprise coupling holes 48.

The coupling portions 44 and 47 are at different distances from the rotational axis X of the right crank arm 5. In particular, their axes of symmetry S1 and S2 lie on two ideal circumferences of different diameter.

As illustrated in FIGS. 1, 3, 6, 7 and 12, the coupling portions 44 and 47 are preferably non-radially aligned with each other. Indeed, the coupling portions 44 are at smaller angular distances γ apart than the angular distances between the coupling portions 47.

Both the big front sprocket 10 and the small front sprocket 15 are coupled with the main body 20 of the crank arm 5 at the additional coupling portion 46.

Figure 5:
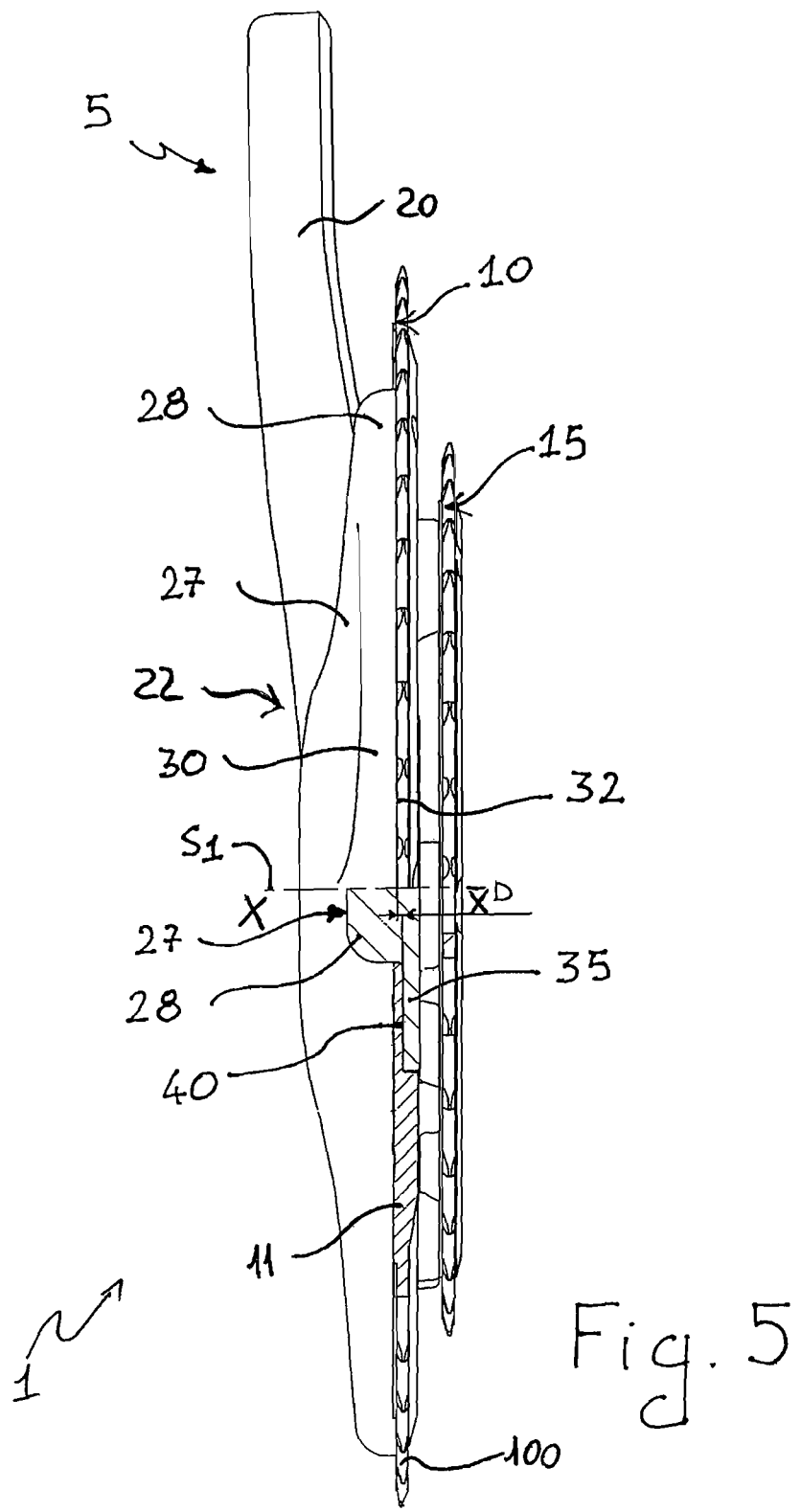
FIG. 5 is a section view according to the section line V-V of FIG. 3.

With particular reference now to the section illustrated in FIG. 5, in a preferred embodiment described herein the contact elements 30 and 35 respectively at the outer side and at the inner side of the big front sprocket 10 are located substantially at the opposite side with respect to the coupling portions 44, identified by the axis of symmetry S1 (said axis is parallel to the rotational axis x of the crank arm 5). In particular, the surface 32 of the element 30 for contact at the outer side of the front sprocket 10 follows the coupling portion 44 in the direction of rotation ω, whereas the surface 40 of the element 35 for contact at the inner side of the front sprocket 10 precedes the coupling portion 44 (FIGS. 6 and 7). The elements 30 and 35 are therefore active in abutment on the front sprocket at different angular positions. It should be appreciated from FIG. 5 that the first contact element 30 and the second contact 40 element are offset from one another along the rotational axis of the right crank arm 5; this offset creates a gap in which the front sprocket 10 is engaged.

Figure 13:
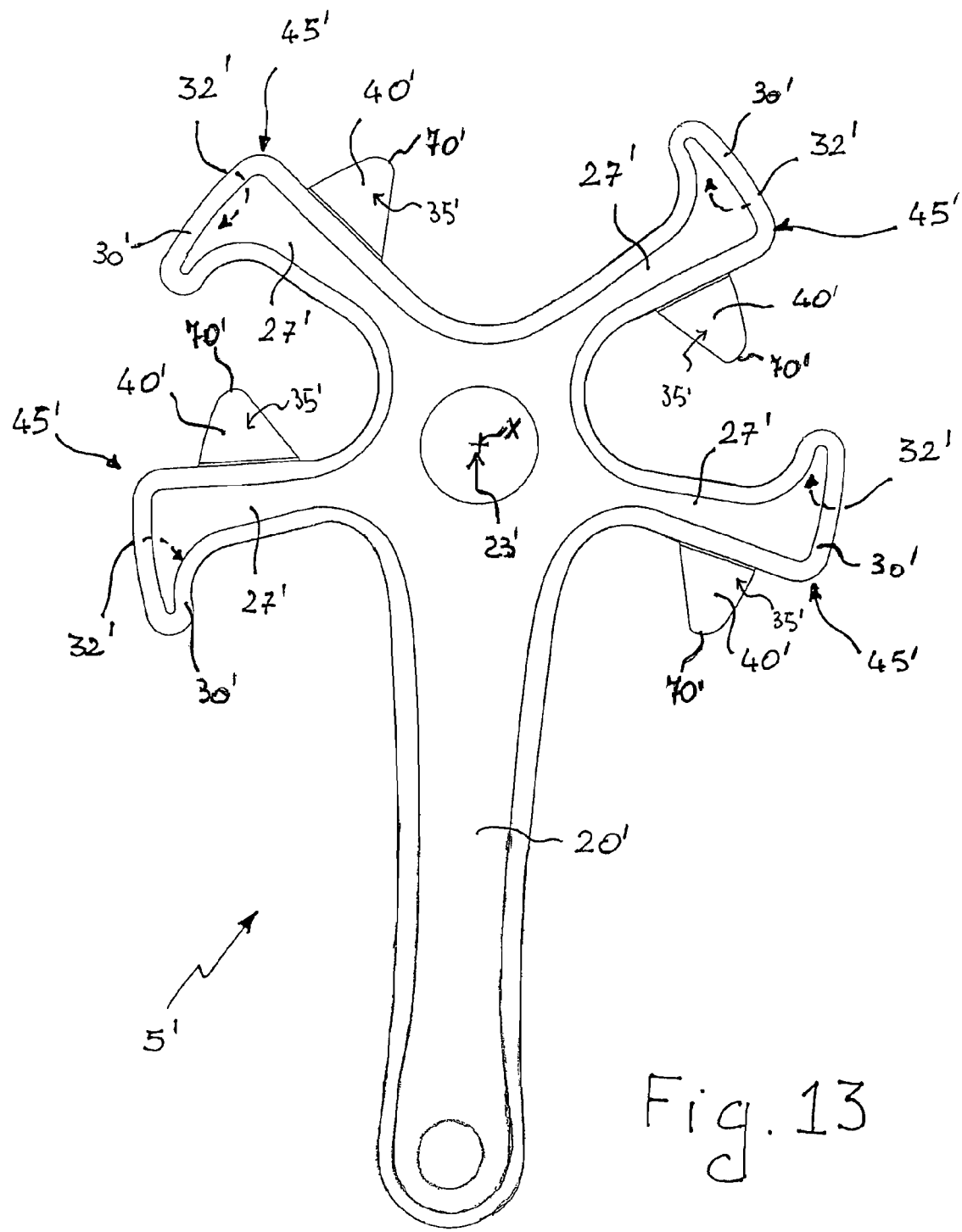
FIG. 13 is a front view of the outer side of an alternative embodiment of the crank arm described herein.

In an alternative embodiment of the crank arm illustrated in FIG. 13 and indicated with 5', the arms 27' instead of being connected in sets of two through the elements 30, each comprise an element 30' extending cantilevered circumferentially around the rotational axis X of the crank arm 5'. Each element 30' comprises a respective contact surface 32' at the outer side of the big front sprocket 10. Each of the arms 27' also comprises a respective contact surface 40' at the inner side of the big front sprocket 10. The contact surfaces 32' and 40' are arranged in a position respectively prior to and after the coupling portion 44 (hidden in the figures) provided on the arm 27. In this case, the number of arms 27 can also be odd, for example three or five.

In a further not illustrated embodiment of the assembly described herein, just one or in any case just a few of the arms 27 comprise a contact surface 40 at the inner side of the big front sprocket 10, between which the arm 27 immediately following the elongated body 20 with reference to the direction of rotation ω of the crank arm 5 and preferably the arm 27 arranged in a substantially symmetrical position with respect to the main body 20 of the crank arm 5.

In accordance with the invention, the contact surfaces 32 and 40 do not lie on the same plane, but a predetermined axial distance D apart (FIG. 5). In this way the big front sprocket 10 does not need to be deformed to be inserted between the two contact surfaces. It is thus sufficient for the front sprocket 10 to have a thickness equal to D in the contact area with the crank arm 5. Preferably D is equal to or less than the maximum thickness of the big front sprocket 10.

In the embodiments illustrated in the attached figures, the elements 30 and 35 are integral with the main body 20 of the crank arm 5, but in other not illustrated embodiments such elements can be made in separate pieces and coupled with the crank arm 5.

Figure 10:
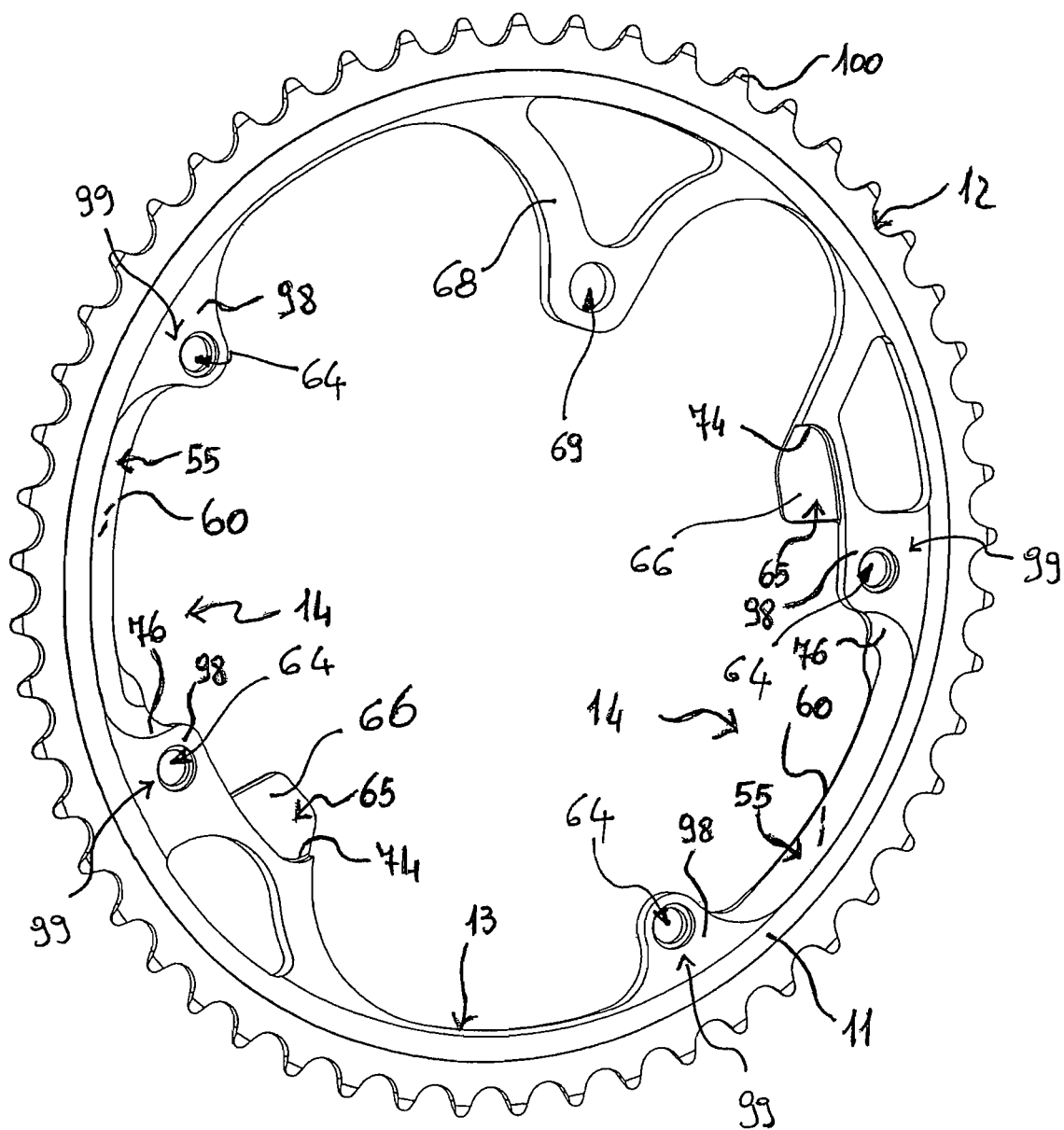
FIGS. 10 and 11 are respectively perspective views of the inner side and of the outer side of a front sprocket according to the present invention, such a front sprocket being used in the assembly of FIG. 1.
Figure 11:
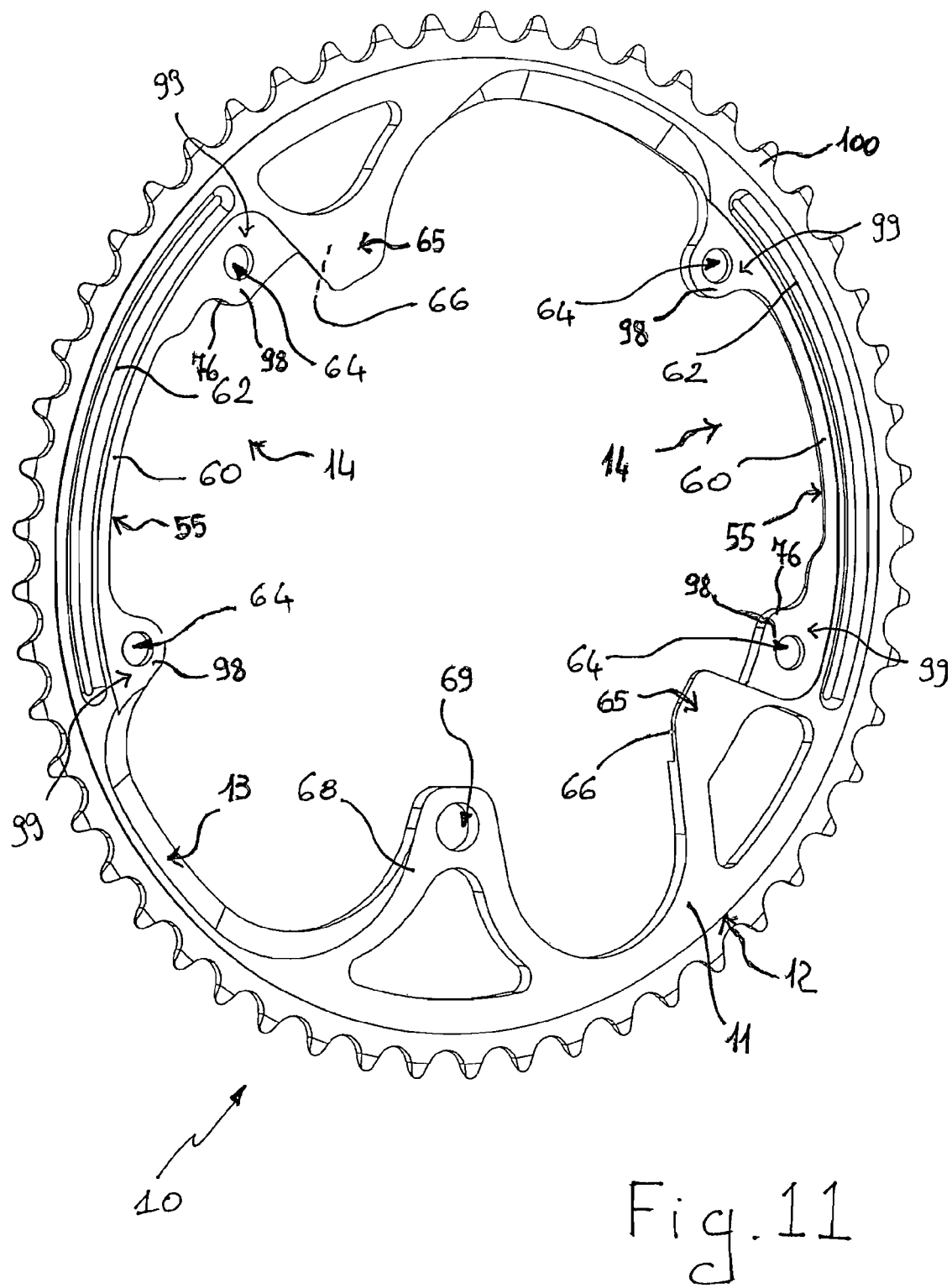

In FIGS. 10 and 11, the big front sprocket 10 of the right crank arm assembly 1 shown in FIGS. 1 and 2 is illustrated.

Such a front sprocket comprises an annular element 11, preferably made from light metal alloy or from composite material, having a radially outer annular surface 12 on which a toothed portion 100 (hereafter also indicated as toothing) is formed extending radially towards the outside and a radially inner annular surface 13 from which four elements 98 for coupling with the crank arm extend radially cantilevered. In particular, the elements 98 are adapted to be coupled with the arms 27 of the crank arm 5 by coupling respective coupling portions defined on the elements 98 with the coupling portions 44 defined on the arms 27. The coupling takes place through screws (not illustrated) inserted in holes 64 formed on each coupling element 98.

On outer side thereof (FIG. 11) the big front sprocket 10 comprises two elements 55 having respective contact surfaces 60 adapted to contact the contact surfaces 32 of the elements 30 of the right crank arm 5. The elements 55 have the same angular extension as the elements 30 and each element 55 extends without structural interruption between two adjacent elements 98. What has been stated above with reference to the number, angular position with respect to the coupling portions 44 and angular extension of the elements 30 of the crank arm 5 with respect to the rotational axis of the crank arm is therefore also valid for the elements 55 of the front sprocket 10 with reference to the coupling portions defined on the elements 98 and with reference to the rotational axis of the front sprocket.

The elements 55 are preferably surmounted in the radial direction by a throat 62 extending according to an arc of circle.

At the ends of the elements 55 the holes 64 for the passage of the screws that insert into the inserts 50 of the right crank arm 5 are formed.

On the inner side of the front sprocket 10 (illustrated in FIG. 10), on the other hand, a pair of elements 65 are provided having respective contact surfaces 66 adapted to contact the contact surfaces 40 of the elements 35 of the right crank arm 5.

The big front sprocket 10 further comprises an additional arm 68 with a hole 69 for the passage of a screw intended to insert into the hole formed in the additional coupling portion 46 of the crank arm 5, in the case in which such an additional coupling portion is present.

In the embodiment of the big front sprocket 10 illustrated in detail in FIGS. 10 and 11, each contact element 55 and 65 with the crank arm 5 is defined at a single body portion 14 of the annular element 11 that extends radially cantilevered towards the centre of the front sprocket 10 from inner surface 13 thereof and that also comprises a pair of coupling elements 98. The elements 55, 65, and 98 are therefore all an integral part of the body portion 14.

Figure 14:
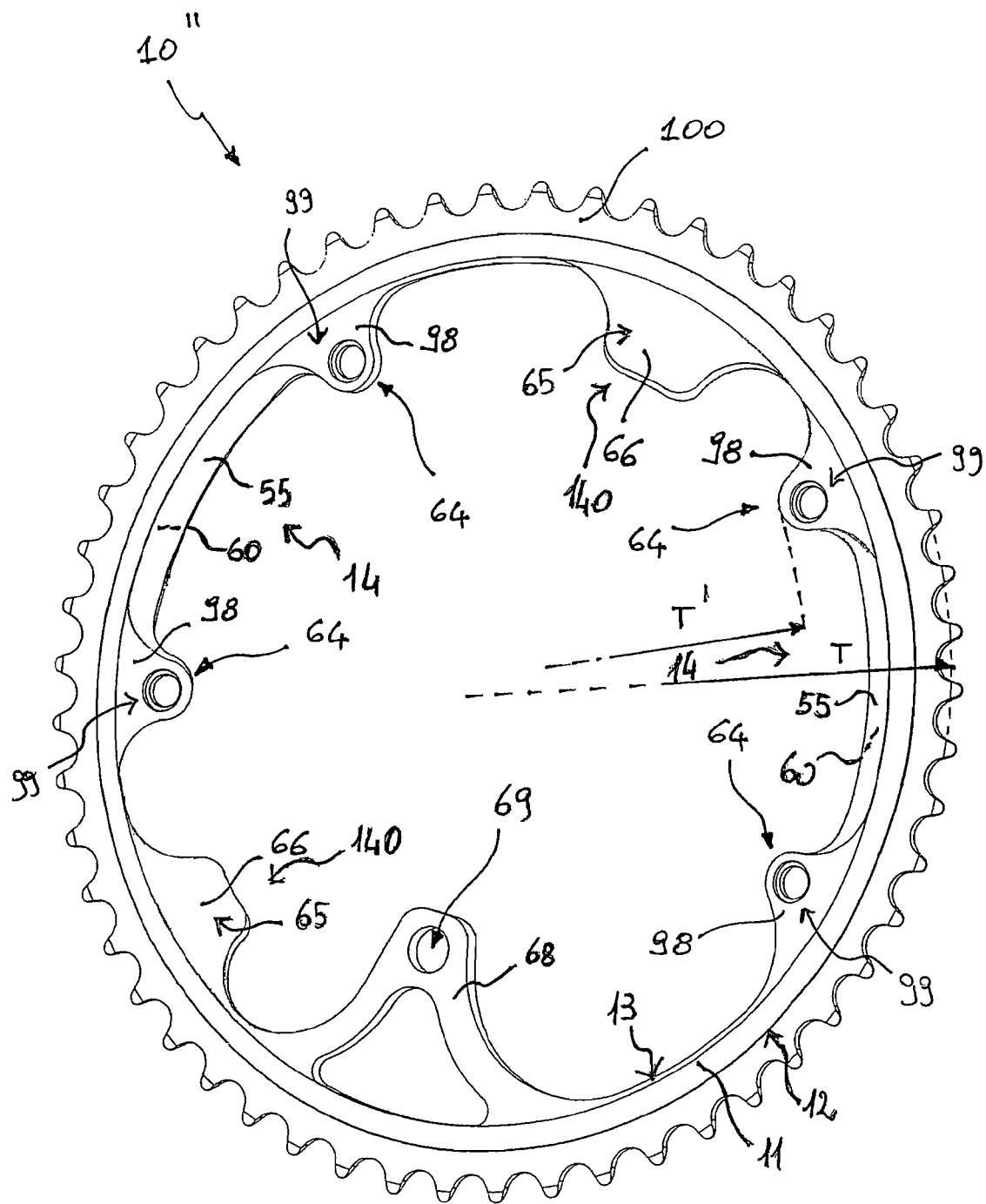
FIG. 14 is a perspective view of the inner side of an alternative embodiment of the front sprocket described herein.

FIG. 14 shows an alternative embodiment of the big front sprocket, indicated with 10. In such an embodiment no single body portion 14 that comprises the elements 65 and 98 can be identified. Indeed, the body portion 14 here comprises just the contact element 55 and a pair of elements 98 for coupling with the crank arm 5, whereas the contact elements 65 with the crank arm are defined at further and respective body portions 140, distinct and separate from the body portion 14 of the annular element 11, which also extend radially cantilevered from the inner surface 14 of the annular element 11 towards the centre of the front sprocket 10 and which do not comprise the coupling elements 98 and the contact elements 55 with the crank arm 5.

In such an embodiment, the elements 98 and 65 are made adjacent to the toothed portion 100 of the front sprocket 10. Preferably, considering the diameter T of the primitive circumference of the toothed portion 100, the elements 98 and 65 are located and entirely contained in an annular area extending radially between the inner surface of said annular element and an ideal circumference of diameter T' such that T>T'≧aT, where a is selected from ⅔, ¾, ⅘, ⅚ or 6/7.

Preferably, the aforementioned inner surface is defined at an ideal circumference arranged at least 1 mm radially towards the inside from the toothed portion 100.

The front sprocket 10 in this case therefore reduces to a toothed band provided with radial projections constituting the coupling elements 98 and the contact elements 55 and 65 and having a short radial extension. Consequently, the maximum radial extension of the coupling arms provided in the crank arm is defined by a circumference of diameter T" (see FIGS. 2 and 4) such that T>T">T', where the difference between T and T" is simply given by the need to leave a free front sprocket portion which is sufficient to allow the engagement of the teeth with a chain.

Figure 4:
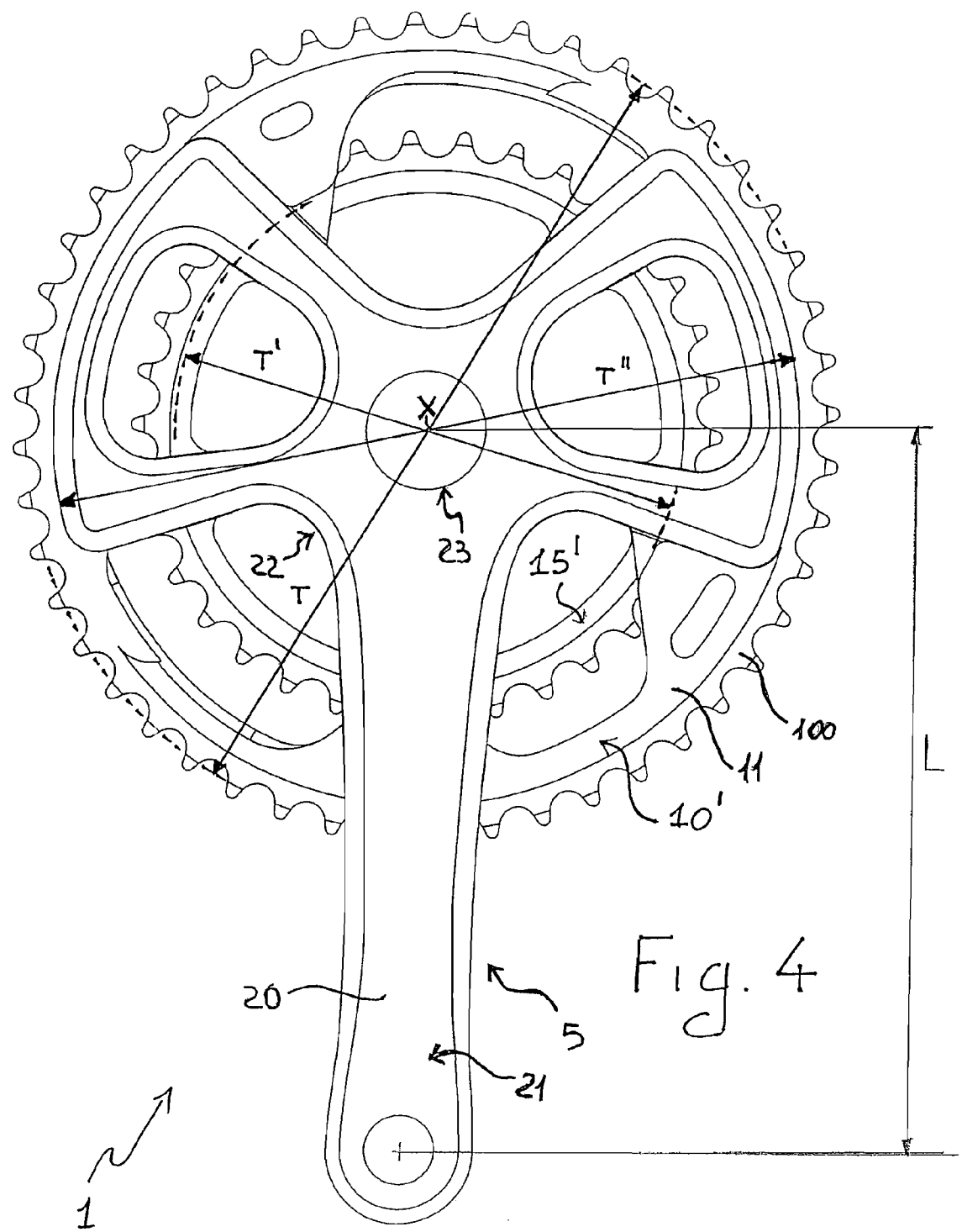
FIG. 4 is a front view of the outer side of the assembly of FIG. 3.

With particular reference to FIG. 4, if L indicates the length of the arm of the crank arm (such a length being commercially set at 170 mm, 172.5 mm and 175 mm), the crank arm of the assembly described herein is sized so that the ratio L/T" is between 0.7 and 1, preferably between 0.8 and 0.9.

A not illustrated embodiment is foreseen in which the front sprocket has coupling elements 98 and contact elements 55 and 65 of short extension as described above with reference to FIG. 14 and all forming part of a single body portion 14 as described above with reference to FIG. 11.

It should be noted how, in all of the embodiments of the front sprocket 10 of the assembly described herein, the contact portions of the front sprocket 10 with the crank arm 5 are structurally and physically distinct from the respective coupling portions.

In the case of use of the front sprocket of FIG. 11 or of the not illustrated embodiment in which the front sprocket has coupling elements 98 and contact elements 55 and 65 of short extension as described above with reference to FIG. 14 and all forming part of a single body portion 14 as described above with reference to FIG. 11, the crank arm of the assembly described herein has coupling arms having a greater radial extension than those of conventional crank arms. In particular, while in conventional crank arms the diameter of the ideal circumference defined by the coupling holes at the big front sprocket and at the small front sprocket is 130 mm or 135 mm in the case of standard combinations and 110 mm in the case of compact combinations, in the crank arm of the assembly described herein the diameter of the ideal circumference defined by the holes 45 for coupling with the big front sprocket 10 is within an annular area having an inner diameter greater than or equal to 150 mm and an outer diameter less than or equal to 180 mm, preferably an inner diameter greater than or equal to 160 mm and an outer diameter less than or equal to 170 mm, whereas that of the ideal circumference defined by the holes 48 for coupling with the small front sprocket 15 is within an annular area having an inner diameter greater than or equal to 100 mm and an outer diameter less than or equal to 130 mm, preferably an inner diameter greater than or equal to 110 mm and an outer diameter less than or equal to 120 mm.

FIGS. 1 and 2 show a right crank arm assembly comprising a combination of standard front sprockets, i.e. a small front sprocket with a minimum of 39 teeth coupled with a big front sprocket with a number of teeth of between 52 and 56 (53 in the front sprocket 10 illustrated).

However, the right crank arm 5 illustrated in FIGS. 6, 7 and 8 can support a wide range of combinations of front sprockets, for example a compact combination, as illustrated in FIGS. 3 and 4, in which the small front sprocket 15' has a minimum number of teeth equal to 34 and the big front sprocket 10' has a number of teeth of between 46 and 50 (48 in the combination illustrated).

It should however be noted that the right crank arm 5 allows any size of front sprockets to be mounted, for which reason it is also possible to adopt combinations of front sprockets different to the standard and compact ones, in particular mixed combinations.

As illustrated in FIGS. 6, 7, 8, 13, the crank arm 5, 5' further comprises abutment surfaces 70, 70' adapted to allow the correct angular positioning of the crank arm with respect to the front sprocket 10. Such surfaces 70, 70' are defined at a free end of the contact element 35, 35' with the crank arm 5, 5'. Further abutment surfaces 72 are provided at a body portion of the element 35 that extends on the opposite side, with respect to the coupling arm 27, to the one at which the abutment surface 70 is defined. The abutment surfaces 70 and 72 cooperate in abutment with corresponding abutment surfaces 74, 76 defined in the big front sprocket 10.

Figure 12:
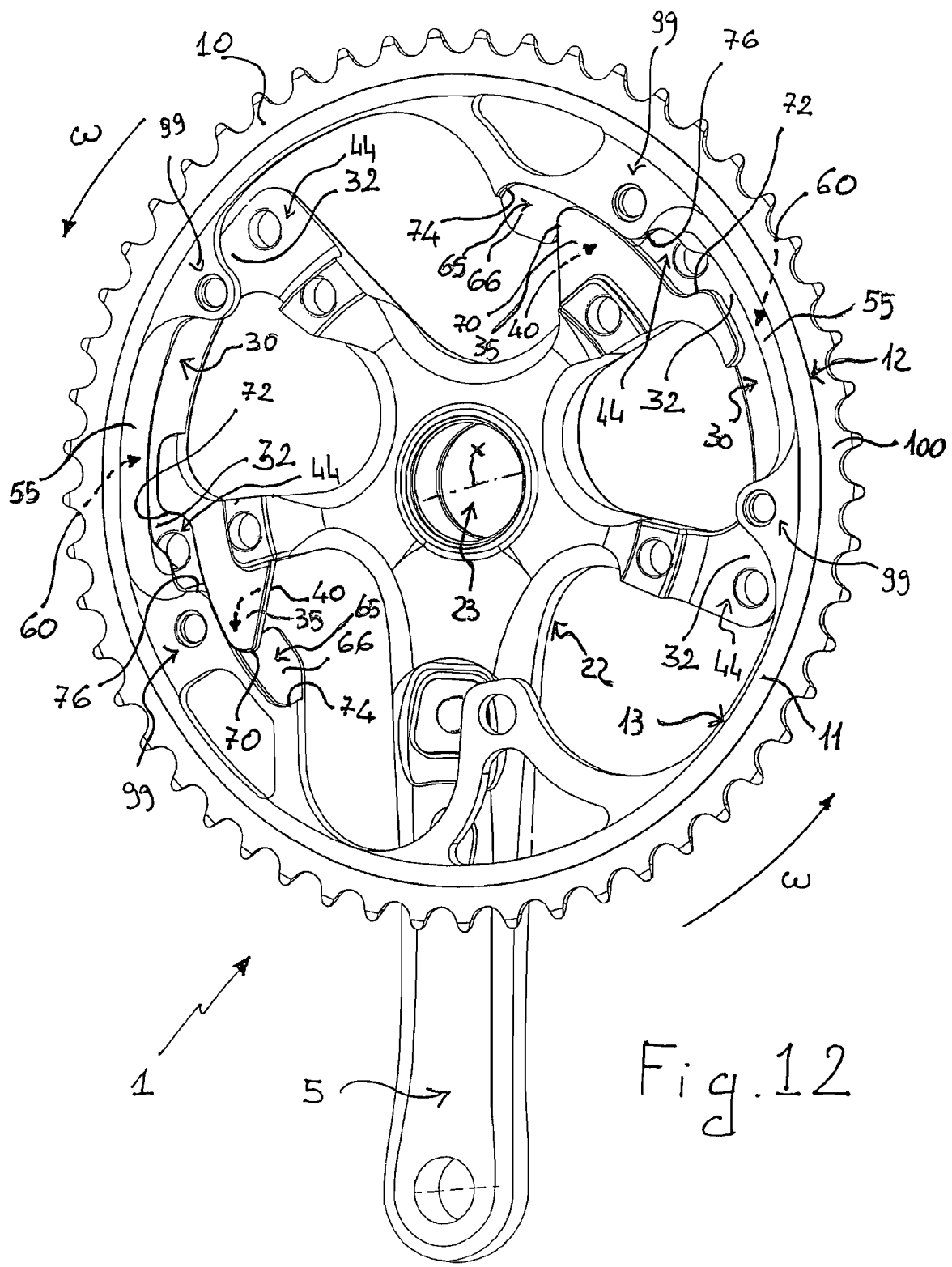
FIG. 12 shows a mounting step of the front sprocket of FIGS. 10 and 11 onto the crank arm of FIGS. 6 to 8.

FIG. 12 illustrates the way to mount a big front sprocket 10 on a right crank arm 5. In particular, the big front sprocket 10 is brought in contact with the right crank arm 5 so that the contact surfaces 32 of the elements 30 of the crank arm 5 come into contact with the contact surfaces 60 of the elements 55 of the front sprocket 10. At this point the right crank arm 5 is rotated with respect to the front sprocket 10 in the same direction of rotation ω in which it rotates during pedaling. The crank arm 5 shall move with respect to the front sprocket until the abutment surfaces 70 and 72 of the right crank arm 5 make contact with the corresponding abutment surfaces 74 and 76 of the front sprocket 10. At this point, the contact surfaces 40 of the elements 35 of the crank arm 5 shall be in abutment with the contact surfaces 66 of the elements 65 of the front sprocket 10. As a result of this, when the surfaces 74 and 76 of the front sprocket 10 are in abutment with the surfaces 70 and 72 of the crank arm, the contact surfaces 32, 40, 60 and 66 cooperate with each other to keep it in position and the operator has both hands free to fix the screws.

It should be appreciated that the first contact element 55 and the second contact element 65 are offset from one another along a rotational axis of the annular element 11.

Figure 15:
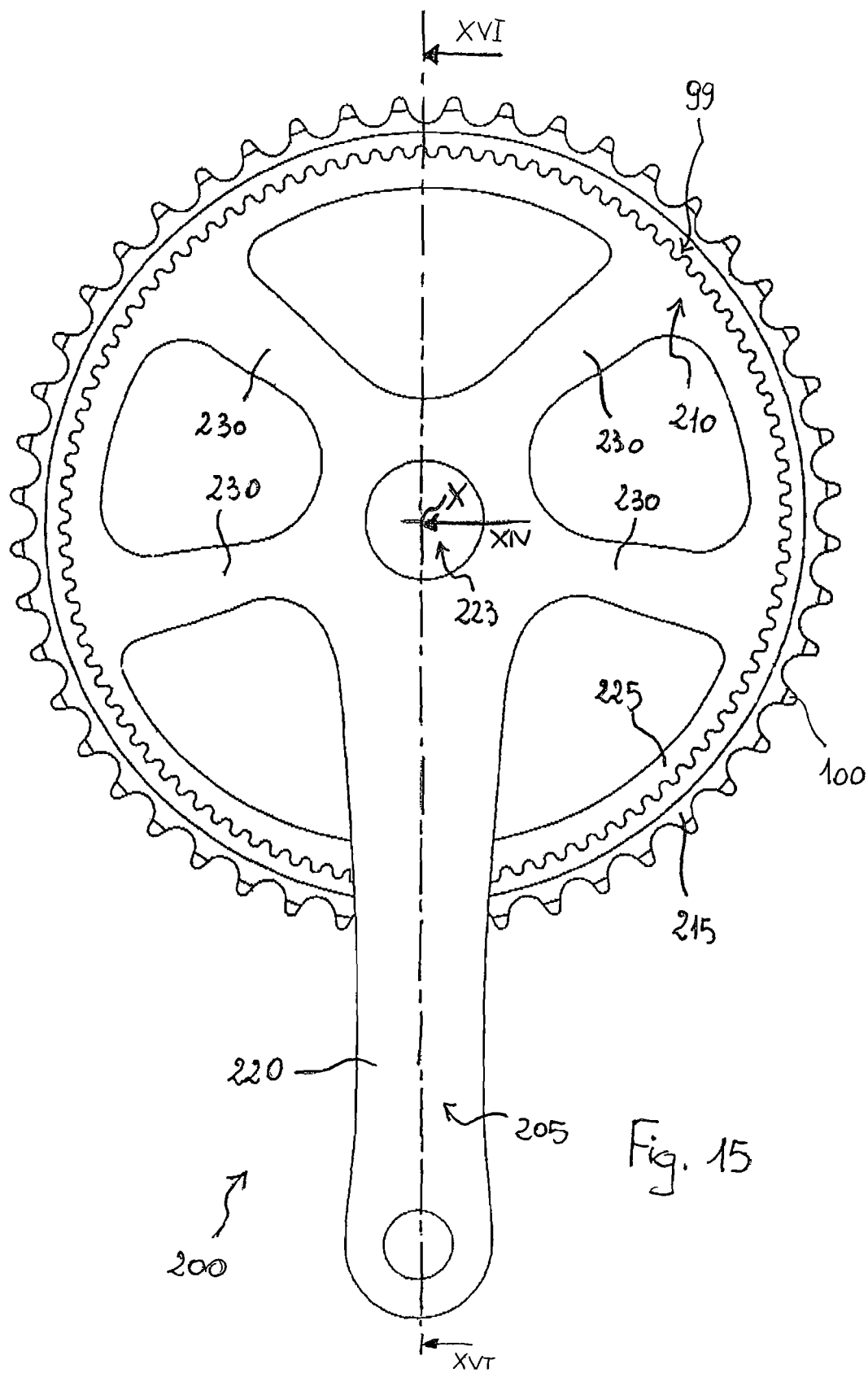
FIGS. 15 and 16 are respectively a front view of the outer side and a perspective view sectioned according to the line XVI-XVI of FIG. 15, of an alternative embodiment of a right crank arm assembly according to the present invention.
Figure 16:
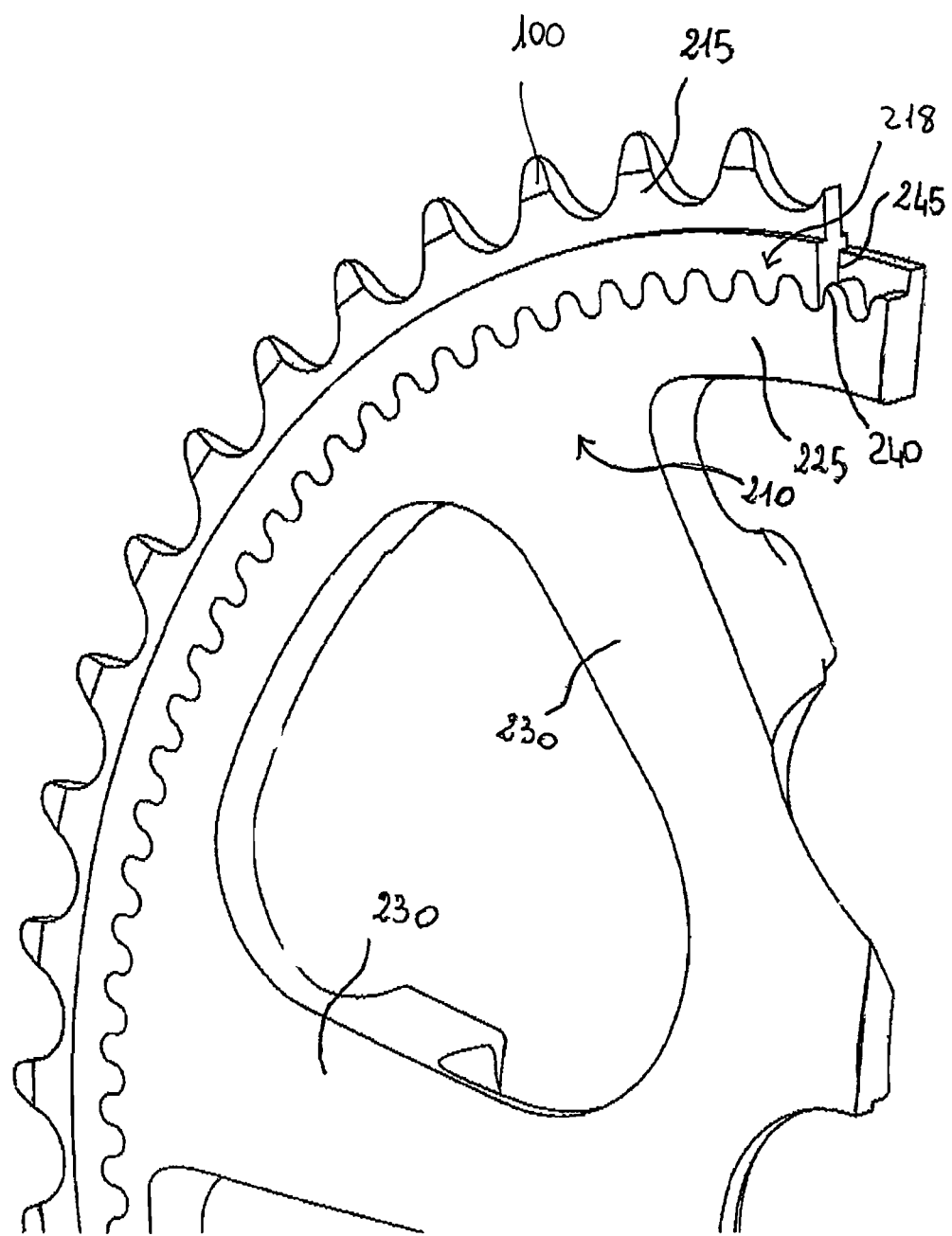

Now with reference to FIGS. 15 and 16, a further embodiment of the right crank arm assembly according to the present invention is illustrated, indicated with 200.

The right crank arm assembly 200 comprises a right crank arm 205, preferably made from composite material, comprising a coupling portion 210 with an annular toothed band 215. The coupling portion 210 preferably comprises an annular-shaped outer peripheral portion 225 coupled with the elongated body 220 of the crank arm 205 through a plurality of coupling arms 230.

The coupling between the coupling portion 210 and the toothed band 215 can be of any type capable of transmitting torque. In FIG. 16, as an example, a shape-coupling is illustrated, in particular toothed, preferably strengthened by gluing, or by the adhesion between composite material of the coupling portion 210 and the metal of the toothed band 215 obtained by co-molding. Alternatively, the toothed band 215 and the coupling portion 210 could be made with a threading at their interface to be screwed (and then possibly glued) one to the other. According to a further alternative, the toothed band 215 is fixed onto the coupling portion 210 through screws or other fastening elements.

It should be observed that, although FIG. 16 shows a radial coupling interface 240 and a circumferential coupling interface 245, it does not exclude embodiments in which the coupling is just circumferential or just radial (in which case there are no front or rear contact surfaces as for the embodiments of FIGS. 1 to 14). The coupling between the toothed band 205 and the coupling portion 210 could also be a dovetail coupling, or a coupling extending along a surface inclined with respect to the rotational axis of the annular toothed band 215.

It should also be observed that, although in FIG. 15 just one annular toothed band 215 is shown, an embodiment is foreseen in which the right crank arm 205 is also coupled with a front sprocket or annular band of smaller diameter. The coupling between such an annular band of smaller diameter and the right crank arm 205 is of the same type as that described with reference to the annular toothed band 215.

As highlighted in the variant 200' of FIG. 17, the coupling portion 210', instead of being extended according to a complete ring, can comprise ring portions 225', for example having the dimensions illustrated with reference to the support structure 25 of the crank arm 5 of FIGS. 6, 7 and 8. The coupling between the coupling portion 210' and the annular toothed band 215' is of the same type described for the assembly 200 of FIGS. 15 and 16.

Figure 17:
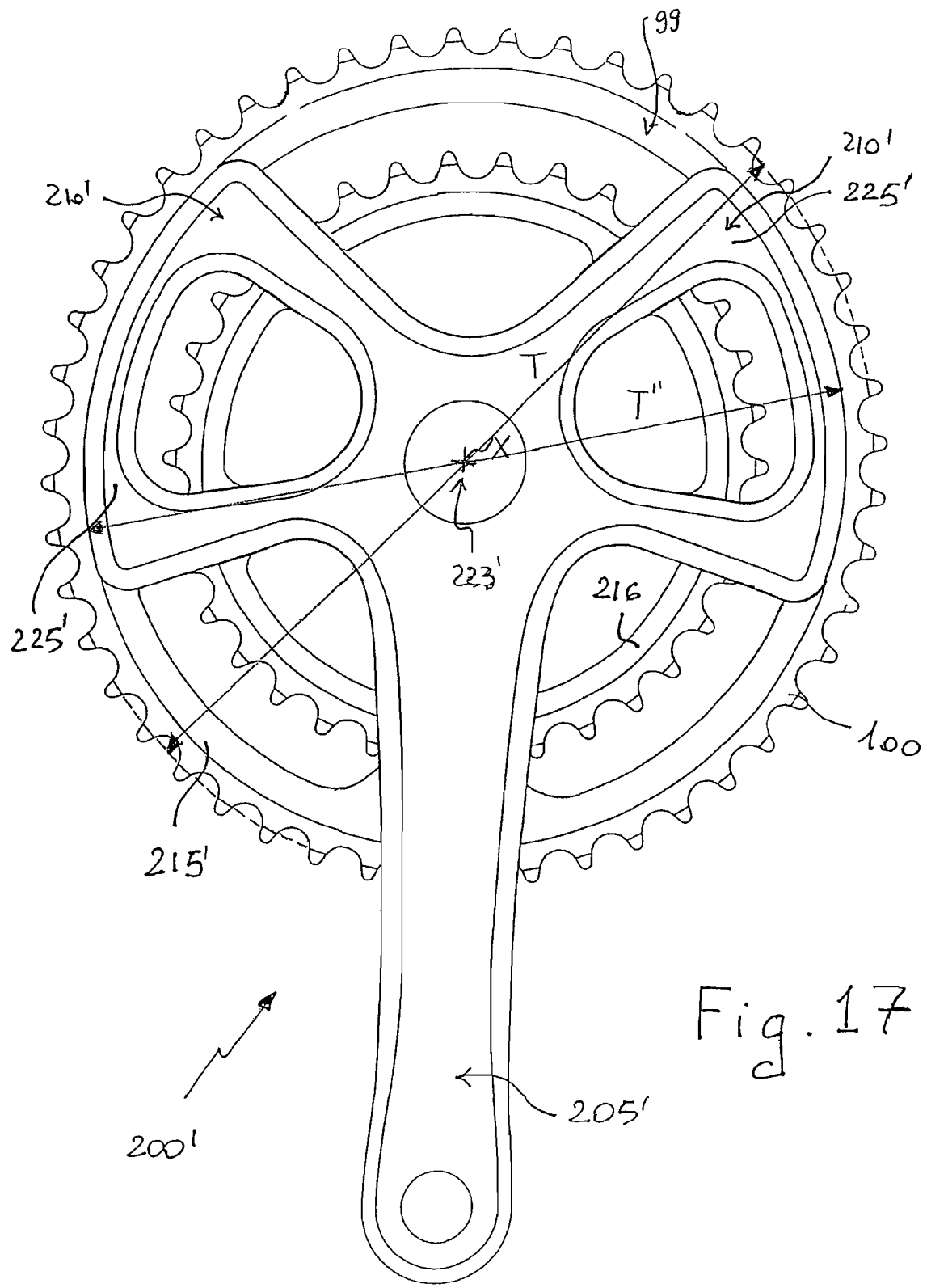
FIG. 17 is a front view of the outer side of a further embodiment of a right crank arm assembly according to the present invention.

FIG. 17 also shows that the right crank arm assembly 200' (just like the one 200 of FIG. 15) can comprise a second front sprocket or toothed band 216 of smaller diameter with respect to the toothed band 215'. The small front sprocket 216 can be of the type illustrated with reference to the right crank arm assemblies of FIGS. 1 to 4, or else a toothed band similar to the toothed band 215', coupled with the crank arm 205' in the same way as the toothed band 215'.

In all of the embodiments described and illustrated, the small front sprocket 15 is coupled with the right crank arm 5 in a conventional way, i.e. contacting just the outer side. However, an embodiment is foreseen in which the coupling between the small front sprocket 15 and the crank arm 5 is the same as that described for the big front sprocket 10, i.e. contacting both the outer side and the inner side.

Numerous variants of the right crank arm 5 are possible, for example the position of the contact elements at the outer side and at the inner side of the big front sprocket can be inverted with respect to the coupling portions, thus performing their contact function in different angular positions of pedaling. The illustrated example is that in which the contact elements counteract the twisting of the front sprocket in the most critical condition, i.e. when the pedal has passed the vertical to begin a new descent, since this is the point at which the cyclist exerts the maximum thrust. The contact surfaces can also face each other and therefore are at an identical angular position.

What is claimed is:

1. Right crank arm assembly for a bicycle, comprising a right crank arm and at least one front sprocket coupled with said crank arm at least one first coupling portion of said crank arm, wherein said at least one front sprocket has an inner side intended, in use, to face towards a frame of the bicycle and an outer side opposite said inner side, and wherein said right crank arm comprises at least one first crank arm element which contacts one of said sides of the at least one front sprocket, and at least one second crank arm element which is formed in a single piece with the at least one first crank arm element and contacts the other of said sides of the at least one front sprocket, said at least one first crank arm element and said at least one second crank arm element being angularly offset from one another along a circumferential direction.

2. Crank arm assembly according to claim 1, wherein said crank arm comprises a main body and wherein said at least one first crank arm element and at least one second crank arm element are formed in a single piece with said main body.

3. Crank arm assembly according to claim 2, wherein said main body of said crank arm comprises a first body portion that couples with a bicycle pedal and a second body portion that couples with said at least one front sprocket and with a shaft of a bottom bracket assembly of a bicycle, wherein said second body portion comprises at least one arm that couples with said at least one front sprocket extending substantially radially with respect to a rotational axis of said crank arm, wherein said at least one first coupling portion is defined in said at least one coupling arm and wherein said at least one first crank arm element and at least one second crank arm element extend from said at least one coupling arm along non-radial directions on opposite sides with respect to said at least one first coupling portion.

4. Crank arm assembly according to claim 3, wherein said crank arm comprises a plurality of coupling arms and wherein said at least one first crank arm element and at least one second crank arm element extend from at least some of said coupling arms.

5. Crank arm assembly according to claim 3, wherein said at least one second crank arm element extends cantilevered from a respective coupling arm.

6. Crank arm assembly according to claim 4 or 5, wherein said at least one first crank arm element extends circumferentially without structural interruption between two adjacent coupling arms.

7. Crank arm assembly according to claim 6, wherein said at least one second crank arm element extends from the coupling arm of said two adjacent coupling arms that precedes the other coupling arm with reference to the direction of rotation of said crank arm during pedaling.

8. Crank arm assembly according to claim 3, wherein said at least one front sprocket includes a first front sprocket having a first diameter and at least one second front sprocket having a second diameter different from said first diameter, wherein said first front sprocket is coupled with said crank arm at said at least one first coupling portion and said at least one second front sprocket is coupled with said crank arm at least one second coupling portion different from said at least one first coupling portion, wherein said at least one second coupling portion is defined in said at least one coupling arm.

9. Crank arm assembly according to claim 3, wherein said crank arm further comprises an additional coupling portion defined in said first body portion.

10. Crank arm assembly according to claim 9, wherein said first front sprocket and at least one second front sprocket couple with said crank arm at said additional coupling portion.

11. Crank arm assembly according to claim 1, comprising a plurality of first crank arm elements and a plurality of second crank arm elements.

12. Crank arm assembly according to claim 1, wherein at least some of said at least one first crank arm element and at least one second crank arm element extend at least partially along respective non-radial directions with respect to a rotational axis of said crank arm about which the crank arm rotates.

13. Crank arm assembly according to claim 12, wherein at least some of said at least one first crank arm element and at least one second crank arm element extend at least partially circumferentially.

14. Crank arm assembly according to claim 13, wherein at least some of said at least one first crank arm element and at least one second crank arm element extend around said rotational axis of said crank arm along respective arcs of circumference having an angular extension of less than 360°.

15. Crank arm assembly according to claim 12, wherein said at least one first crank arm element and at least one second crank arm element act in abutment on said at least one front sprocket at different angular positions.

16. Crank arm assembly according to claim 1, wherein said at least one first crank arm element and at least one second crank arm element extend from opposite sides with respect to said at least one first coupling portion.

17. Crank arm assembly according to claim 16, wherein said at least one second crank arm element is arranged in a position that precedes said at least one first coupling portion with reference to the direction of rotation of said crank arm during pedaling and said at least one first crank arm element is arranged in a position that follows said at least one first coupling portion with reference to said direction of rotation.

18. Crank arm assembly according to claim 1, wherein said crank arm comprises at least one abutment surface that when in proper abutment to the at least one front sprocket ensures the correct angular positioning of said crank arm with respect to said at least one front sprocket.

19. Crank arm assembly according to claim 18, wherein said at least one abutment surface is defined at least partially on said at least one second crank arm element.

20. Crank arm assembly according to claim 1, wherein said at least one front sprocket includes a first front sprocket having a first diameter and at least one second front sprocket having a second diameter different from said first diameter, wherein said first front sprocket is coupled with said crank arm at said at least one first coupling portion and said at least one second front sprocket is coupled with said crank arm at least one second coupling portion different from said at least one first coupling portion.

21. Crank arm assembly according to claim 20, wherein said at least one first coupling portion is defined at a first circumference having its center at a rotational axis of said crank arm and said at least one second coupling portion is defined at least one second circumference concentric with said first circumference and having a diameter different from that of said first circumference.

22. Crank arm assembly according to claim 21, wherein said at least one first coupling portion is defined along at least one first substantially radial direction with respect to said rotational axis of the crank arm and said at least one second coupling portion is defined along at least one second substantially radial direction different from said first substantially radial direction.

23. Crank arm assembly according to claim 20, comprising at least two first coupling portions arranged at a first predetermined angular distance one from the other and at least two second coupling portions arranged at a second predetermined angular distance one from the other, said second predetermined angular distance being less than said first predetermined angular distance.

24. Crank arm assembly according to claim 1, wherein said crank arm is made from composite material.

25. Crank arm assembly according to claim 1, comprising at least one first front sprocket element that cooperates with said at least one first crank arm element and at least one second front sprocket element that cooperates with said at least one second crank arm element.

26. Crank arm assembly according to claim 25, wherein at least some of said at least one first crank arm element and at least one second crank arm element extend at least partially along respective non-radial directions with respect to a rotational axis of said crank arm about which the crank arm rotates, wherein at least some of said at least one first crank arm element and at least one second crank arm element extend at least partially circumferentially wherein said at least one first front sprocket element has an angular extension substantially equal to that of said at least one first crank arm element.

27. Crank arm assembly according to claim 25, wherein said at least one front sprocket comprises an annular element having a radially inner surface from which at least one coupling element extends radially cantilevered towards said crank arm.

28. Crank arm assembly according to claim 27, wherein said at least one first front sprocket element and at least one second front sprocket element are defined in a body portion of said annular element extending radially cantilevered from said radially inner surface and comprising said at least one coupling element.

29. Crank arm assembly according to claim 27, wherein said at least one second front sprocket element is defined by a respective body portion of said annular element extending radially cantilevered from said radially inner surface, said respective body portion not comprising said at least one coupling element.

30. Crank arm assembly according to claim 27, wherein said annular element is made from a composite material.

31. Right crank arm for a bicycle, comprising a main body with at least one first coupling portion, wherein said main body comprises at least one first contact element and at least one second contact element that is formed in a single piece with the first contact element, said at least one first contact element and said at least one second contact element being angularly offset from one another along a circumferential direction and axially offset from one another along a rotational axis of the right crank arm, said axial offset creating a gap between said at least one first element and said at least one second element along the rotational axis, the at least one second contact element having a contact surface that faces a corresponding contact surface of the at least one first contact element.

32. Crank arm according to claim 31, wherein said at least one first contact element and at least one second contact element are formed in a single piece with said main body.

33. Crank arm according to claim 31, wherein said main body comprises a plurality of first contact elements and a plurality of second contact elements.

34. Crank arm according to claim 31, wherein at least some of said at least one first contact element and at least one second contact element extend at least partially along respective non-radial directions with respect to a rotational axis of said crank arm.

35. Crank arm according to claim 34, wherein at least some of said at least one first contact element and at least one second contact element extend at least partially circumferentially.

36. Crank arm according to claim 35, wherein at least some of said at least one first contact element and at least one second contact element extend around said rotational axis of said crank arm along respective arcs of circumference having an angular extension of less than 360°.

37. Crank arm according to claim 36, wherein said respective arcs of circumference have different angular positions with respect to said rotational axis.

38. Crank arm according to claim 31, wherein said at least one first contact element and at least one second contact element extend from opposite sides with respect to said at least one first coupling portion.

39. Crank arm according to claim 38, wherein said at least one second contact element is arranged in a position that precedes said at least one first coupling portion with reference to the direction of rotation of the crank arm during pedaling and said at least one first contact element is arranged in a position that follows said at least one first coupling portion with reference to said direction of rotation.

40. Crank arm according to claim 31, wherein said main body comprises at least one abutment surface that allows the correct angular positioning of said crank arm with respect to at least one front sprocket.

41. Crank arm according to claim 40, wherein said at least one abutment surface is defined at least partially on said at least one second contact element.

42. Crank arm according to claim 31, wherein said main body comprises at least one first coupling portion at a different radial distance from the rotational axis than at least one second coupling portion.

43. Crank arm according to claim 42, wherein said at least one first coupling portion is defined at a first circumference having its center at the rotational axis of said crank arm and said at least one second coupling portion is defined at least one second circumference concentric with said first circumference and having a diameter different to that of said first circumference.

44. Crank arm according to claim 43, wherein said at least one first coupling portion is defined along at least one first substantially radial direction with respect to said rotational axis and said at least one second coupling portion is defined along at least one second substantially radial direction different from said first substantially radial direction.

45. Crank arm according to claim 42, wherein said main body comprises at least two first coupling portions arranged at a first predetermined angular distance one from the other and at least two second coupling portions arranged at a second predetermined angular distance one from the other, said second predetermined angular distance being shorter than said first predetermined angular distance.

46. Crank arm according to claim 31, wherein said main body comprises a first body portion that couples with a bicycle pedal and a second body portion with at least one arm that extends substantially radially with respect to a rotational axis of said crank arm, wherein said at least one first coupling portion is defined in said at least one coupling arm and said at least one first contact element and at least one second contact element extend from said at least one coupling arm along non-radial directions on opposite sides with respect to said at least one coupling portion.

47. Crank arm according to claim 46, wherein said main body comprises a plurality of coupling arms and wherein said at least one first contact element and at least one second contact element extend from at least some of said coupling arms.

48. Crank arm according to claim 47, wherein said at least one first contact element extends circumferentially without structural interruption between two adjacent coupling arms.

49. Crank arm according to claim 48, wherein said at least one second contact element extends from the coupling arm that precedes said at least one coupling portion with reference to the direction of rotation of said crank arm during pedaling.

50. Crank arm according to claim 46, wherein said at least one second contact element extends cantilevered from a respective coupling arm.

51. Crank arm according to claim 46, wherein said main body comprises at least one first coupling portion at a different radial distance from the rotational axis than at least one second coupling portion, wherein said at least one second coupling portion is defined in said at least one coupling arm.

52. Crank arm according to claim 31, wherein said main body is made from light metal material or from composite material.

53. Front sprocket for a crankset of a bicycle, comprising an annular element having at least one coupling portion, said annular element comprising at least one first contact element and at least one second contact element, said at least one first contact element and said at least one second contact element being formed in a single piece with each other, angularly offset from one another along a circumferential direction, and axially offset from one another along a rotational axis of the annular element.

54. Front sprocket according to claim 53, wherein said annular element comprises a plurality of first contact elements and a plurality of second contact elements.

55. Front sprocket according to claim 53, wherein said at least one first contact element and at least one second contact element extend at least partially along respective non-radial directions with respect to a rotational axis of said front sprocket.

56. Front sprocket according to claim 55, wherein said at least one first contact element and at least one second contact element extend at least partially circumferentially around said rotational axis of said front sprocket along respective arcs of circumference having an angular extension of less than 360°.

57. Front sprocket according to claim 56, wherein said respective arcs of circumference have different angular positions with respect to said rotational axis.

58. Front sprocket according to any one of claim 53, wherein said at least one first contact element and at least one second contact element extend from opposite sides with respect to said at least one coupling portion.

59. Front sprocket according to claim 58, wherein said at least one second contact element is arranged in a position that precedes said at least one coupling portion with reference to the direction of rotation of the front sprocket during pedaling and said at least one first contact element is arranged in a position that follows said at least one coupling portion with reference to said direction of rotation.

60. Front sprocket according to claim 53, wherein said annular element comprises at least one abutment surface adapted to allow the correct angular positioning of said front sprocket with respect to said crank arm.

61. Front sprocket according to claim 60, wherein said at least one abutment surface is defined at least partially in said at least one second contact element.

62. Front sprocket according to claim 53, wherein said annular element comprises a radially inner surface from which at least one coupling element with said crank arm extends radially, said at least one coupling portion being defined in said at least one coupling element.

63. Front sprocket according to claim 62, wherein said at least one first contact element and at least one second contact element are defined in a body portion of said annular element extending radially cantilevered from said radially inner surface and comprising said at least one coupling element.

64. Front sprocket according to claim 62, wherein said at least one second contact element is defined by a respective body portion of said annular element extending radially cantilevered from said radially inner surface, wherein said respective body portion does not include said at least one coupling element.

65. Front sprocket according to claim 62, wherein said at least one first contact element extends circumferentially without structural interruption between two adjacent coupling elements.

66. Front sprocket according to claim 63, wherein said annular element is made from a composite alloy.

67. Right crank arm assembly for a bicycle, comprising a right crank arm and at least one front sprocket coupled with said crank arm, wherein said right arm assembly comprises at least one first crank arm element that contacts said at least one front sprocket and that extends along a non-radial direction with respect to a rotational axis of said crank arm, and at least one second crank arm element formed in a single piece with said at least one first crank arm element and angularly offset from said at least one first crank arm element along a circumferential direction, wherein said at least one front sprocket has an inner side that faces towards a frame of said bicycle and an outer side opposite said inner side, and said at least one first crank arm element contacts said at least one front sprocket on said outer side, and said at least one second crank arm element contacts said at least one second crank arm element on said inner side.

68. Crank arm assembly according to claim 67, wherein said crank arm comprises at least one coupling arm with said at least one front sprocket extending along a substantially radial direction and wherein said at least one crank arm element extends from said at least one coupling arm.

69. Crank arm assembly according to claim 68, wherein said crank arm comprises a plurality of coupling arms and wherein said at least one crank arm element extends from at least some of said coupling arms.

70. Crank arm assembly according to claim 69, wherein said at least one crank arm element extends circumferentially without structural interruption between two adjacent coupling arms.

71. Crank arm assembly according to any one of claims 67 to 69, wherein said at least one crank arm element extends at least partially circumferentially around said rotational axis of said crank arm along an arc of circumference having a predetermined angular extension.

72. Crank arm assembly according to claim 71, wherein said angular extension is less than 360° and greater than or equal to 15°.

73. Crank arm assembly according to claim 72, wherein said angular extension is between 15° and 100°.

74. Crank arm assembly according to claim 73, wherein said angular extension is between 30° and 75°.

75. Crank arm assembly according to claim 72, wherein said at least one crank arm element extends cantilevered from said at least one coupling arm.

76. Crank arm assembly according to claim 67, wherein said crank arm is made from a composite material.

77. Crank arm assembly according to claim 67, comprising at least one front sprocket element that cooperates with said at least one crank arm element, wherein said at least one front sprocket element has an angular extension substantially equal to that of said at least one crank arm element.

78. Crank arm assembly according to claim 77, wherein said at least one front sprocket comprises an annular element having a radially inner surface from which at least one coupling element with said crank arm extends radially cantilevered.

79. Crank arm assembly according to claim 78, wherein said annular element is made from a composite material.

80. Right crank arm for a bicycle, comprising a main body adapted to be coupled with at least one front sprocket of a crankset of a bicycle, said at least one front sprocket has an inner side that faces towards a frame of said bicycle and an outer side that faces away from said frame, wherein said main body comprises at least one first contact element that extends along a non-radial direction with respect to a rotational axis of said crank arm and at least one second contact element formed in a single piece with said at least one first contact element and angularly offset from said at least one first contact element along a circumferential direction, wherein said at least one first contact element contacts said at least one front sprocket on said outer side, and said at least one second contact element contacts said at least one front sprocket on said inner side.

81. Crank arm according to claim 80, wherein said main body comprises at least one coupling arm with said at least one front sprocket extending along a substantially radial direction and wherein said at least one contact element extends from said at least one coupling arm.

82. Crank arm according to claim 81, wherein said main body comprises a plurality of coupling arms and wherein said at least one contact element extends from at least some of said coupling arms.

83. Crank arm according to claim 82, wherein said at least one contact element extends circumferentially without structural interruption between two adjacent coupling arms.

84. Crank arm according to claim 80, wherein said at least one contact element extends at least partially circumferentially around said rotational axis along an arc of circumference having a predetermined angular extension.

85. Crank arm according to claim 84, wherein said angular extension is less than 360° and greater than or equal to 15°.

86. Crank arm according to claim 85, wherein said angular extension is between 15° and 100°.

87. Crank arm according to claim 86, wherein said angular extension is between 30° and 75°.

88. Crank arm according to claim 80, wherein said main body is made from a composite material.

89. Front sprocket for a crankset of a bicycle, comprising an annular element adapted to be coupled with a right crank arm of a bicycle, wherein said annular element comprises at least one first contact element that contacts a side of said right crank arm and extends along a non-radial direction with respect to a rotational axis of said front sprocket, and at least one second contact element that is formed in a single piece with said at least one first contact element and contacts an opposing side of said right crank arm, said at least one first contact element and at least one second contact element being angularly offset from one another along a circumferential direction.

90. Front sprocket according to claim 89, wherein said annular element comprises at least one coupling element and wherein said at least one contact element extends from said at least one coupling element.

91. Front sprocket according to claim 89, wherein said at least one coupling element extends radially cantilevered from a radially inner surface of said annular element.

92. Front sprocket according to claim 89, wherein said annular element is made from a composite material.

93. Right crank arm assembly for a bicycle, comprising a right crank arm and at least one front sprocket coupled with said crank arm at least one first coupling portion of said crank arm, wherein said at least one front sprocket has an inner side intended, in use, to face towards a frame of the bicycle and an outer side opposite said inner side, and wherein said crank arm comprises at least one first crank arm element which contacts one of said sides of the at least one front sprocket, at least one second crank arm element which contacts the other of said sides of the at least one front sprocket, and a main body, said at least one first crank arm element and at least one second crank arm element being angularly offset from one another along a circumferential direction, and being formed in a single piece with each other and with said main body.

94. Right crank arm for a bicycle, comprising a main body with at least one first coupling portion, wherein said main body comprises at least one first contact element and at least one second contact element, said at least one first contact element and said at least one second contact element being angularly offset from one another along a circumferential direction and axially offset from one another along a rotational axis of the right crank arm, said axial offset creating a gap between said at least one first element and said at least one second element along this rotational axis, and wherein said at least one first contact element and at least one second contact element are formed in a single piece with each other and with said main body.

95. Right crank arm assembly for a bicycle, comprising a right crank arm and at least one front sprocket coupled with said crank arm, wherein said right arm assembly comprises at least one first crank arm element which contacts said at least one front sprocket and that extends along a non-radial direction with respect to a rotational axis of said crank arm, and at least one second crank arm element that is formed in a single piece with said at least one first crank arm element and angularly offset from said at least one first crank arm element along a circumferential direction, said crank arm comprising a main body and said at least one first crank arm element being formed in a single piece with said main body.

* * * * *

UNITED STATES PATENT AND TRADEMARK OFFICE
CERTIFICATE OF CORRECTION

PATENT NO. : 8,479,610 B2
APPLICATION NO. : 11/832205
DATED : July 9, 2013
INVENTOR(S) : Maurizio Valle and Paolo Pasqua Page 1 of 2

It is certified that error appears in the above-identified patent and that said Letters Patent is hereby corrected as shown below:

ON THE TITLE PAGE

In item (57), under "ABSTRACT" in Column 2, Line 3, delete "crank arm at least" and insert -- crank arm at at least --, therefor.

IN THE SPECIFICATION

In Column 2, Line 13, delete "crank arm at least" and insert -- crank arm at at least --, therefor.

In Column 4, Line 56, delete "crank arm at least" and insert -- crank arm at at least --, therefor.

In Column 5, Line 2, delete "defined at least" and insert -- defined at at least --, therefor.

In Column 7, Line 15, delete "bicycle at least" and insert -- bicycle at at least --, therefor.

In Column 8, Line 23, delete "defined at least" and insert -- defined at at least --, therefor.

In Column 12, Line 23, delete "crank arm at least" and insert -- crank arm at at least --, therefor.

In Column 13, Line 40, delete "crank arm 6" and insert -- crank arm 5 --, therefor.

In Column 19, Lines 14-15, delete "toothed band 205" and insert -- toothed band 215 --, therefor.

IN THE CLAIMS

In Column 19, Line 63, in Claim 1, delete "crank arm at least" and insert -- crank arm at at least --, therefor.

Signed and Sealed this
Eighteenth Day of March, 2014

Michelle K. Lee
*Deputy Director of the United States Patent and Trademark Office*

CERTIFICATE OF CORRECTION (continued)
U.S. Pat. No. 8,479,610 B2

In Column 20, Lines 51-52, in Claim 8, delete "crank arm at least" and insert -- crank arm at at least --, therefor.

In Column 21, Lines 42-43, in Claim 20, delete "crank arm at least" and insert -- crank arm at at least --, therefor.

In Column 21, Line 49, in Claim 21, delete "defined at least" and insert -- defined at at least --, therefor.

In Column 23, Line 31, in Claim 43, delete "defined at least" and insert -- defined at at least --, therefor.

In Column 24, Line 40, in Claim 58, delete "according to any one of claim" and insert -- according to claim --, therefor.

In Column 27, Line 1, in Claim 93, delete "crank arm at least" and insert -- crank arm at at least --, therefor.